(12) United States Patent
Thorson et al.

(10) Patent No.: US 12,179,378 B2
(45) Date of Patent: Dec. 31, 2024

(54) OSCILLATING MULTI-TOOL SYSTEM

(71) Applicant: MILWAUKEE ELECTRIC TOOL CORPORATION, Brookfield, WI (US)

(72) Inventors: Troy C. Thorson, Cedarburg, WI (US); Jeffrey M. Wackwitz, Waukesha, WI (US); Emily Doberstein, San Diego, CA (US); James Wekwert, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/338,129

(22) Filed: Jun. 20, 2023

(65) Prior Publication Data
US 2023/0339135 A1  Oct. 26, 2023

Related U.S. Application Data

(63) Continuation of application No. 17/162,823, filed on Jan. 29, 2021, now Pat. No. 11,724,413, which is a
(Continued)

(51) Int. Cl.
*B27B 5/30* (2006.01)
*B23B 31/10* (2006.01)
(Continued)

(52) U.S. Cl.
CPC ............... *B27B 5/30* (2013.01); *B23B 31/10* (2013.01); *B23B 31/19* (2013.01);
(Continued)

(58) Field of Classification Search
CPC ........... B27B 5/30; B23B 31/10; B23B 31/19; B23B 31/4073; B24B 23/04; B24B 45/006
See application file for complete search history.

(56) References Cited

U.S. PATENT DOCUMENTS

| 81,661 A | 9/1868 | McDonald |
| 197,650 A | 11/1877 | Milligan |

(Continued)

FOREIGN PATENT DOCUMENTS

| DE | 1878647 | 8/1963 |
| DE | 4312162 | 10/1994 |

(Continued)

OTHER PUBLICATIONS

EP Designs 000535174-0001 and 000535174-0002 for cutting discs, show at http://oami.europa.eu/RCDOnline/RequestManager.
(Continued)

*Primary Examiner* — Nathaniel C Chukwurah
(74) *Attorney, Agent, or Firm* — Michael Best & Friedrich LLP

(57) ABSTRACT

An oscillating power tool includes a housing, a motor, a tool holder driven oscillatingly, a flange threadedly coupled to a plunger, and a lever pivotable between a clamping position and a release position. The flange is configured to be movable in an axial direction. The flange is configured to clamp the output element onto the tool holder in the clamping position and configured to be displaced a first distance from the tool holder in the release position. The lever includes a cam surface including a substantially flat surface configured to engage the plunger in the release position. In the release position, a gap is disposed between the lever and the housing to allow the lever to be rotated past the release position. The lever is configured to displace the flange a second distance from the tool holder, larger than the first distance, when rotated past the release position.

20 Claims, 25 Drawing Sheets

Related U.S. Application Data continuation of application No. 16/200,111, filed on Nov. 26, 2018, now Pat. No. 10,940,605, which is a continuation of application No. 15/413,815, filed on Jan. 24, 2017, now Pat. No. 10,137,592, which is a continuation of application No. 14/270,560, filed on May 6, 2014, now Pat. No. 9,555,554.

(60) Provisional application No. 61/820,018, filed on May 6, 2013.

(51) Int. Cl.
  *B23B 31/19* (2006.01)
  *B23B 31/40* (2006.01)
  *B24B 23/04* (2006.01)
  *B24B 45/00* (2006.01)

(52) U.S. Cl.
  CPC .......... *B23B 31/4073* (2013.01); *B24B 23/04* (2013.01); *B24B 45/006* (2013.01); *Y10T 279/33* (2015.01)

(56) References Cited

U.S. PATENT DOCUMENTS

| | | |
|---|---|---|
| 223,103 A | 12/1879 | Berstler |
| 241,178 A | 5/1881 | Amazeen |
| 390,134 A | 9/1888 | Miller |
| 519,892 A | 5/1894 | Newton |
| 742,000 A | 10/1903 | Brooks |
| 1,947,662 A | 2/1934 | Robinson |
| 2,132,917 A | 10/1938 | Albertson |
| 2,550,768 A | 5/1951 | Burleigh |
| 2,649,868 A | 8/1953 | Gommel |
| 2,822,648 A | 2/1958 | Metzger et al. |
| 2,846,826 A | 8/1958 | Miller |
| 2,854,042 A | 9/1958 | Robinson |
| 2,912,021 A | 11/1959 | Gommel |
| 2,997,819 A | 8/1961 | Schacht |
| 3,041,797 A | 7/1962 | Moffly |
| 3,095,515 A | 6/1963 | Case et al. |
| 3,100,270 A | 8/1963 | Case et al. |
| 3,308,703 A | 3/1967 | Sauer |
| 3,440,915 A | 4/1969 | Weyant |
| 3,623,281 A | 11/1971 | Moffat |
| 3,667,169 A | 6/1972 | MacKay, Jr. |
| 3,758,799 A | 9/1973 | Dochterman et al. |
| 3,874,073 A | 4/1975 | Dochterman et al. |
| 3,908,499 A | 9/1975 | Reed |
| 3,943,934 A | 3/1976 | Bent |
| 4,015,371 A | 4/1977 | Grayston |
| 4,343,214 A | 8/1982 | Schädlich |
| 4,393,626 A | 7/1983 | Schroer |
| 4,432,264 A | 2/1984 | Scott |
| 4,436,006 A | 3/1984 | Nakamura et al. |
| 4,436,009 A | 3/1984 | Ask |
| 4,461,195 A | 7/1984 | Barnick |
| 4,475,873 A | 10/1984 | Jensen et al. |
| D276,310 S | 11/1984 | Frieberg |
| 4,497,141 A | 2/1985 | Jarby |
| 4,637,170 A | 1/1987 | Block |
| 4,657,428 A | 4/1987 | Wiley |
| 4,671,364 A | 6/1987 | Fink et al. |
| 4,683,683 A | 8/1987 | Block |
| 4,695,755 A | 9/1987 | Brown |
| 4,700,478 A | 10/1987 | Mezger et al. |
| 4,716,386 A | 11/1987 | Wiley |
| 4,730,952 A | 3/1988 | Wiley |
| 4,739,435 A | 4/1988 | Nothofer |
| 4,758,755 A | 7/1988 | Sherman et al. |
| 4,779,382 A | 10/1988 | Rudolf |
| 4,787,147 A | 11/1988 | Wiley |
| 4,800,315 A | 1/1989 | Schulz et al. |
| 4,847,721 A | 7/1989 | Nothofer et al. |
| 4,852,261 A | 8/1989 | Wittek |
| 4,905,420 A | 3/1990 | Flachenecker et al. |
| 4,908,534 A | 3/1990 | Gubler et al. |
| D308,011 S | 5/1990 | Norris |
| 4,920,702 A | 5/1990 | Kloss et al. |
| 4,924,635 A | 5/1990 | Rudolf et al. |
| 4,976,071 A | 12/1990 | Stabler |
| 4,980,976 A | 1/1991 | Junginger et al. |
| 4,989,320 A | 2/1991 | Borkott et al. |
| 4,989,374 A * | 2/1991 | Rudolf .................. B24B 23/022 451/344 |
| D315,667 S | 3/1991 | Johnson |
| 5,038,478 A | 8/1991 | Mezger et al. |
| 5,058,909 A | 10/1991 | Rudolf et al. |
| 5,062,743 A | 11/1991 | Wieland et al. |
| D327,111 S | 6/1992 | Hemming |
| 5,157,873 A | 10/1992 | Rudolf et al. |
| 5,231,910 A | 8/1993 | Harsch et al. |
| 5,263,283 A | 11/1993 | Rudolf et al. |
| 5,265,340 A | 11/1993 | Nitz et al. |
| 5,292,352 A | 3/1994 | Rudolf et al. |
| 5,303,688 A | 4/1994 | Chiuminatta et al. |
| 5,309,805 A | 5/1994 | Mezger et al. |
| 5,319,886 A | 6/1994 | Steere, Jr. |
| 5,319,889 A | 6/1994 | Rudolf et al. |
| 5,366,312 A | 11/1994 | Raines |
| 5,373,834 A | 12/1994 | Chiuminatta et al. |
| 5,382,249 A | 1/1995 | Fletcher |
| 5,441,450 A | 8/1995 | Fein et al. |
| D362,065 S | 9/1995 | Goris |
| 5,468,247 A | 11/1995 | Matthai et al. |
| 5,477,845 A | 12/1995 | Zuzelo |
| 5,482,499 A | 1/1996 | Satoh |
| 5,491,896 A | 2/1996 | Stolzer et al. |
| 5,494,368 A | 2/1996 | Matthews |
| 5,496,316 A | 3/1996 | Goris |
| 5,554,066 A | 9/1996 | Bosten et al. |
| 5,555,788 A | 9/1996 | Gakhar et al. |
| 5,597,347 A | 1/1997 | Bosten et al. |
| 5,601,483 A * | 2/1997 | Rudolf .................. B24B 23/022 451/344 |
| 5,626,510 A | 5/1997 | Bergner et al. |
| 5,637,034 A | 6/1997 | Everts et al. |
| 5,681,213 A | 10/1997 | Hashii |
| 5,694,693 A | 12/1997 | Hutchins et al. |
| 5,702,415 A | 12/1997 | Matthai et al. |
| 5,709,595 A | 1/1998 | Bergner et al. |
| 5,729,904 A | 3/1998 | Trott |
| 5,731,651 A | 3/1998 | Hyodo |
| 5,743,791 A | 4/1998 | Bosten et al. |
| 5,749,770 A | 5/1998 | Uzumcu et al. |
| 5,759,094 A | 6/1998 | Bosten et al. |
| 5,842,278 A | 12/1998 | Gmeilbauer |
| 5,846,244 A | 12/1998 | Cripe |
| 5,901,629 A | 5/1999 | Stroud |
| 5,911,620 A | 6/1999 | Spangenberg et al. |
| 5,926,940 A | 7/1999 | Toh et al. |
| 5,967,886 A | 10/1999 | Wuensch et al. |
| 6,004,194 A | 12/1999 | Hild et al. |
| 6,022,353 A | 2/2000 | Fletcher et al. |
| 6,042,460 A | 3/2000 | Bosten et al. |
| D424,076 S | 5/2000 | Dibbern et al. |
| 6,099,311 A | 8/2000 | Wagner et al. |
| 6,099,397 A | 8/2000 | Wurst |
| 6,110,028 A | 8/2000 | Chung |
| 6,116,996 A | 9/2000 | Yanase |
| 6,129,618 A | 10/2000 | Frech |
| 6,132,300 A | 10/2000 | Martin |
| 6,142,858 A | 11/2000 | Luedeke |
| 6,155,916 A | 12/2000 | Rudolf et al. |
| 6,159,084 A | 12/2000 | Tiede |
| 6,257,969 B1 | 7/2001 | Bosten et al. |
| 6,277,012 B1 | 8/2001 | Halliley |
| 6,293,859 B1 | 9/2001 | Fink et al. |
| 6,299,078 B1 | 10/2001 | Fugere |
| 6,306,024 B1 | 10/2001 | Kai et al. |
| 6,332,836 B1 | 12/2001 | Tseng |
| 6,340,022 B1 | 1/2002 | Schroer |
| 6,349,446 B1 | 2/2002 | Krause et al. |
| 6,361,424 B1 | 3/2002 | Manor et al. |

(56) References Cited

U.S. PATENT DOCUMENTS

| | | |
|---|---|---|
| 6,371,837 B1 | 4/2002 | Luedeke |
| 6,379,236 B1 | 4/2002 | Takizawa et al. |
| 6,401,342 B1 | 6/2002 | Kloss et al. |
| 6,422,110 B1 | 7/2002 | Wurst et al. |
| 6,434,835 B1 | 8/2002 | Grunikiewicz et al. |
| 6,442,844 B1 | 9/2002 | Grunikiewicz et al. |
| 6,470,772 B2 | 10/2002 | Peisert et al. |
| D466,597 S | 12/2002 | Carr |
| D467,485 S | 12/2002 | Daniels et al. |
| 6,503,253 B1 | 1/2003 | Fletcher et al. |
| 6,520,055 B1 | 2/2003 | Reusch et al. |
| 6,523,214 B1 | 2/2003 | Kaiser |
| 6,533,650 B2 | 3/2003 | Yoshida et al. |
| 6,569,001 B2 * | 5/2003 | Rudolf ............. B24B 23/02 451/523 |
| 6,602,122 B1 | 8/2003 | Rudolf et al. |
| 6,629,484 B2 | 10/2003 | Soyama et al. |
| 6,640,377 B2 | 11/2003 | Krause et al. |
| 6,699,112 B2 | 3/2004 | Bergner et al. |
| 6,723,101 B2 | 4/2004 | Fletcher et al. |
| 6,735,846 B2 | 5/2004 | Du |
| 6,749,493 B2 | 6/2004 | Wuensch |
| D493,683 S | 8/2004 | Hortenbury et al. |
| 6,780,093 B2 | 8/2004 | Krondorfer et al. |
| 6,786,811 B2 | 9/2004 | Krondorfer et al. |
| 6,796,888 B2 | 9/2004 | Jasch |
| 6,802,127 B2 | 10/2004 | Thomaschewski |
| 6,802,764 B2 | 10/2004 | Besch |
| 6,814,655 B2 | 11/2004 | Hofmann et al. |
| 6,814,657 B2 | 11/2004 | Spangenberg et al. |
| 6,827,074 B2 | 12/2004 | Gardner |
| 6,860,792 B2 | 3/2005 | Krondorfer et al. |
| 6,865,813 B2 | 3/2005 | Pollak |
| 6,869,346 B2 | 3/2005 | Wendt et al. |
| 6,902,471 B2 | 6/2005 | Krondorfer et al. |
| 6,910,694 B2 | 6/2005 | Hartmann et al. |
| 6,926,595 B2 | 8/2005 | Pollak et al. |
| 6,942,558 B2 | 9/2005 | Wuensch |
| 6,942,560 B2 | 9/2005 | Hofmann et al. |
| 6,945,862 B2 | 9/2005 | Jasch et al. |
| 6,946,758 B2 | 9/2005 | Du et al. |
| 7,000,606 B2 | 2/2006 | Gardner |
| 7,013,552 B2 | 3/2006 | Du |
| 7,038,570 B2 | 5/2006 | McMichael et al. |
| 7,077,734 B2 | 7/2006 | Tiede et al. |
| 7,077,735 B2 | 7/2006 | Krondorfer et al. |
| 7,096,566 B2 | 8/2006 | Du et al. |
| 7,097,548 B2 | 8/2006 | Krondorfer et al. |
| D528,407 S | 9/2006 | Schwab |
| 7,108,077 B2 | 9/2006 | Ziser |
| 7,115,027 B2 | 10/2006 | Thomaschewski |
| 7,115,028 B1 | 10/2006 | Chen |
| 7,137,329 B1 | 11/2006 | Moser |
| 7,143,760 B2 | 12/2006 | Gardner |
| 7,169,025 B2 | 1/2007 | Schumacher |
| 7,187,260 B2 | 3/2007 | Hashimoto et al. |
| 7,201,644 B2 | 4/2007 | Gardner |
| 7,207,873 B2 | 4/2007 | Hesse et al. |
| 7,215,048 B2 | 5/2007 | Du et al. |
| 7,217,177 B2 | 5/2007 | Frech et al. |
| 7,256,520 B2 | 8/2007 | Braun et al. |
| 7,273,412 B1 | 9/2007 | Sun et al. |
| 7,274,866 B2 | 9/2007 | Rudolf et al. |
| 7,313,838 B2 | 1/2008 | Long et al. |
| 7,344,435 B2 | 3/2008 | Pollak et al. |
| D567,046 S | 4/2008 | Henssler et al. |
| 7,402,095 B2 | 7/2008 | Gardner |
| 7,438,629 B2 | 10/2008 | Bosten et al. |
| 7,464,455 B2 | 12/2008 | Du et al. |
| 7,506,877 B1 | 3/2009 | Henderson et al. |
| 7,510,464 B2 | 3/2009 | Stierle et al. |
| 7,527,628 B2 | 5/2009 | Fletcher et al. |
| 7,565,712 B2 | 7/2009 | Long et al. |
| 7,588,484 B2 | 9/2009 | Momosaki |
| 7,591,063 B2 | 9/2009 | West |
| D602,756 S | 10/2009 | Henssler et al. |
| D609,545 S | 2/2010 | Ueno et al. |
| 7,658,237 B2 | 2/2010 | Rudolf et al. |
| 7,677,328 B2 | 3/2010 | Chin |
| 7,687,565 B2 | 3/2010 | Geilemkirchen |
| 7,695,352 B2 | 4/2010 | Schumacher |
| D619,152 S | 7/2010 | Evatt et al. |
| D621,427 S | 8/2010 | Dow et al. |
| D623,034 S | 9/2010 | Evatt et al. |
| D626,977 S | 11/2010 | Popov |
| D626,978 S | 11/2010 | Huh |
| 7,854,649 B2 | 12/2010 | Bohne et al. |
| D643,700 S | 8/2011 | Schultheiss et al. |
| 7,997,586 B2 | 8/2011 | Ziegler et al. |
| D646,539 S | 10/2011 | Maras |
| D646,540 S | 10/2011 | Maras |
| D651,499 S | 1/2012 | Tong |
| D651,874 S | 1/2012 | Davidian et al. |
| D651,875 S | 1/2012 | Davidian et al. |
| D651,878 S | 1/2012 | Davidian et al. |
| D653,523 S | 2/2012 | Wackwitz et al. |
| 8,113,520 B2 | 2/2012 | Zaiser et al. |
| 8,151,679 B2 | 4/2012 | Bohne |
| 8,182,316 B2 | 5/2012 | Peisert |
| 8,185,992 B2 | 5/2012 | Linsbichler et al. |
| 8,187,058 B2 | 5/2012 | Blickle et al. |
| D665,242 S | 8/2012 | Wackwitz |
| D669,754 S | 10/2012 | Wackwitz |
| 8,317,574 B2 * | 11/2012 | Blickle ............. B27B 5/32 451/344 |
| 8,365,419 B2 | 2/2013 | Bernardi et al. |
| 8,381,833 B2 | 2/2013 | Bernardi |
| 8,387,717 B2 | 3/2013 | Kildevaeld |
| 8,397,834 B2 | 3/2013 | Heilig et al. |
| 8,403,341 B2 | 3/2013 | Zaiser et al. |
| D681,081 S | 4/2013 | Neal, Jr. et al. |
| D681,082 S | 4/2013 | Neal, Jr. et al. |
| D682,651 S | 5/2013 | McRoberts et al. |
| D682,652 S | 5/2013 | McRoberts et al. |
| 9,050,663 B2 | 6/2015 | Zhou |
| 9,186,770 B2 | 11/2015 | Montplaisir |
| 9,199,353 B2 | 12/2015 | Ota |
| 2002/0016143 A1 | 2/2002 | Bosten et al. |
| 2002/0022444 A1 | 2/2002 | Littlefield |
| 2002/0066351 A1 | 6/2002 | Sumida et al. |
| 2002/0089240 A1 | 7/2002 | Du |
| 2002/0089241 A1 | 7/2002 | Du |
| 2003/0000716 A1 | 1/2003 | Hofmann et al. |
| 2003/0011269 A1 | 1/2003 | Takano et al. |
| 2003/0153254 A1 | 8/2003 | Bosten et al. |
| 2003/0176225 A1 | 9/2003 | Besch et al. |
| 2004/0056539 A1 | 3/2004 | Du |
| 2004/0192180 A1 | 9/2004 | Bosten et al. |
| 2004/0243136 A1 | 12/2004 | Gupta et al. |
| 2005/0153640 A1 | 7/2005 | Stein et al. |
| 2005/0259943 A1 | 11/2005 | Braun et al. |
| 2006/0080844 A1 | 4/2006 | Bauhuber |
| 2006/0150428 A1 | 7/2006 | Baculy |
| 2006/0255678 A1 | 11/2006 | Du et al. |
| 2006/0261683 A1 | 11/2006 | Du et al. |
| 2006/0261700 A1 | 11/2006 | Du et al. |
| 2006/0272468 A1 | 12/2006 | Gupta et al. |
| 2006/0289183 A1 | 12/2006 | Schreiber |
| 2007/0060030 A1 * | 3/2007 | Pollak ............. B27B 5/32 451/359 |
| 2007/0079489 A1 | 4/2007 | Cirino |
| 2007/0094877 A1 | 5/2007 | Bohne et al. |
| 2007/0266837 A1 | 11/2007 | Nickels et al. |
| 2007/0295156 A1 | 12/2007 | Ziegler et al. |
| 2008/0003929 A1 | 1/2008 | Degen |
| 2008/0017007 A1 | 1/2008 | Weber et al. |
| 2008/0160886 A1 | 7/2008 | Palushaj |
| 2008/0169711 A1 | 7/2008 | Hyun |
| 2008/0190259 A1 | 8/2008 | Bohne |
| 2008/0210212 A1 | 9/2008 | Baratta |
| 2009/0013540 A1 | 1/2009 | Bohne |
| 2009/0023371 A1 * | 1/2009 | Blickle ............. B24B 23/022 451/359 |
| 2009/0083916 A1 | 4/2009 | Lampka et al. |

(56) References Cited

U.S. PATENT DOCUMENTS

| | | |
|---|---|---|
| 2009/0191799 A1 | 7/2009 | Rivard |
| 2009/0209186 A1 | 8/2009 | Krauss et al. |
| 2009/0293696 A1 | 12/2009 | Rauscher et al. |
| 2009/0318065 A1 | 12/2009 | Zaiser et al. |
| 2010/0009613 A1 | 1/2010 | Frueh |
| 2010/0040474 A1 | 2/2010 | Takahashi et al. |
| 2010/0052269 A1 | 3/2010 | Zaiser et al. |
| 2010/0056029 A1 | 3/2010 | Grunikiewicz |
| 2010/0186980 A1 | 7/2010 | Heilig et al. |
| 2010/0210194 A1 | 8/2010 | Thomaschewski et al. |
| 2010/0236806 A1 | 9/2010 | Heilig et al. |
| 2011/0011605 A1 | 1/2011 | Kildevaeld |
| 2011/0036609 A1 | 2/2011 | Blickle et al. |
| 2011/0067894 A1 | 3/2011 | Bernardi |
| 2011/0072946 A1 | 3/2011 | Bernardi et al. |
| 2011/0076927 A1 | 3/2011 | Ho |
| 2011/0139472 A1 | 6/2011 | Bohne |
| 2011/0219929 A1 | 9/2011 | Mann |
| 2011/0227300 A1 | 9/2011 | Zhang et al. |
| 2011/0253405 A1 | 10/2011 | Chen et al. |
| 2011/0256814 A1 | 10/2011 | Steiger et al. |
| 2011/0260414 A1 | 10/2011 | Ota et al. |
| 2011/0266758 A1 | 11/2011 | Sergyeyenko et al. |
| 2011/0266759 A1 | 11/2011 | Goldman |
| 2011/0281508 A1 | 11/2011 | Reid |
| 2011/0291368 A1 | 12/2011 | Chen et al. |
| 2011/0309589 A1 | 12/2011 | Maras |
| 2012/0066919 A1 | 3/2012 | Holba et al. |
| 2012/0067607 A1 | 3/2012 | Weber et al. |
| 2012/0144971 A1 | 6/2012 | Bohne |
| 2012/0169018 A1 | 7/2012 | Lu et al. |
| 2012/0170976 A1 | 7/2012 | Cai |
| 2012/0211951 A1 | 8/2012 | Montplaisir et al. |
| 2012/0255417 A1 | 10/2012 | Frueh et al. |
| 2012/0270005 A1 | 10/2012 | Baratta |
| 2012/0292864 A1 | 11/2012 | Zhou |
| 2013/0082449 A1 | 4/2013 | Bernardi et al. |
| 2013/0104719 A1 | 5/2013 | Rubens et al. |
| 2013/0180747 A1 | 7/2013 | Brown et al. |
| 2013/0193655 A1 | 8/2013 | Kaye, Jr. et al. |
| 2013/0341876 A1 | 12/2013 | Sergyeyenko |
| 2015/0108725 A1 | 4/2015 | Luescher et al. |

FOREIGN PATENT DOCUMENTS

| | | |
|---|---|---|
| DE | 4416475 | 11/1995 |
| DE | 19548461 | 7/1997 |
| DE | 19736933 | 10/1998 |
| DE | 19914956 | 10/2000 |
| DE | 19938106 | 4/2001 |
| DE | 10061559 | 6/2002 |
| DE | 10124437 | 11/2002 |
| DE | 10200381 | 7/2003 |
| DE | 20309329 | 8/2003 |
| DE | 20212403 | 12/2003 |
| DE | 20317521 | 3/2005 |
| DE | 102004046000 | 3/2006 |
| DE | 102004050798 | 4/2006 |
| DE | 202006005747 | 8/2006 |
| DE | 102005020409 | 11/2006 |
| DE | 202006013890 | 12/2006 |
| DE | 102005047402 | 4/2007 |
| DE | 202007007294 | 9/2007 |
| DE | 102006021969 | 11/2007 |
| DE | 20122817 | 3/2008 |
| DE | 102007039367 | 3/2008 |
| DE | 102006000543 | 6/2008 |
| DE | 202004021498 | 7/2008 |
| DE | 102007018467 | 10/2008 |
| DE | 102007036786 | 10/2008 |
| DE | 102007035045 | 1/2009 |
| DE | 202007018679 | 2/2009 |
| DE | 202009004549 | 6/2009 |
| DE | 102008001234 | 10/2009 |
| DE | 102008027671 | 12/2009 |
| DE | 202008009525 | 12/2009 |
| DE | 102009010569 | 8/2010 |
| DE | 102009013370 | 9/2010 |
| DE | 202010013008 | 3/2011 |
| DE | 102010028976 | 11/2011 |
| DE | 102011078488 | 1/2013 |
| EP | 143251 | 6/1985 |
| EP | 180860 | 5/1986 |
| EP | 205730 | 12/1986 |
| EP | 244465 | 11/1987 |
| EP | 260384 | 3/1988 |
| EP | 369390 | 5/1990 |
| EP | 444908 | 9/1991 |
| EP | 792724 | 9/1997 |
| EP | 813934 | 12/1997 |
| EP | 829237 | 3/1998 |
| EP | 953406 | 11/1999 |
| EP | 962283 | 12/1999 |
| EP | 1034870 | 9/2000 |
| EP | 1213107 | 6/2002 |
| EP | 1302286 | 4/2003 |
| EP | 1428625 | 6/2004 |
| EP | 1647366 | 4/2006 |
| EP | 1785231 | 5/2007 |
| EP | 1837124 | 9/2007 |
| EP | 1852218 | 11/2007 |
| EP | 1857223 | 11/2007 |
| EP | 1859899 | 11/2007 |
| EP | 1974881 | 10/2008 |
| EP | 2017036 | 1/2009 |
| EP | 2047952 | 4/2009 |
| EP | 2103395 | 9/2009 |
| EP | 2143531 | 1/2010 |
| EP | 1819490 | 2/2010 |
| EP | 2152475 | 2/2010 |
| EP | 2159000 | 3/2010 |
| EP | 2377647 | 10/2011 |
| EP | 2213416 | 11/2012 |
| FR | 2968589 | 6/2012 |
| WO | WO2008128813 | 10/2008 |
| WO | WO2008128862 | 10/2008 |
| WO | WO2012025330 | 3/2012 |
| WO | WO2012075967 | 6/2012 |
| WO | WO2012126753 | 9/2012 |
| WO | WO2012150066 | 11/2012 |
| WO | WO2013044844 | 4/2013 |

OTHER PUBLICATIONS

Milwaukee Electric Tool Corporation, Bosch tool and accessories, photo, 2010.
Milwaukee Electric Tool Corporation, Bosch tool and adapter, photo, 2010.
Milwaukee Electric Tool Corporation, Bosch tool, photo, 2010.
Milwaukee Electric Tool Corporation, Craftsman tool and accessories, photo, 2010.
Milwaukee Electric Tool Corporation, Craftsman tool, photo, 2010.
Milwaukee Electric Tool Corporation, Dremel tool and accessories, photo, 2010.
Milwaukee Electric Tool Corporation, Dremel tool, photo, 2010.
Milwaukee Electric Tool Corporation, Fein tool and accessories, photo, 2010.
Milwaukee Electric Tool Corporation, Fein tool, photo, 2010.
Milwaukee Electric Tool Corporation, Rockwell tool and accessories, photo, 2010.
Milwaukee Electric Tool Corporation, Rockwell tool, photo, 2010.

* cited by examiner

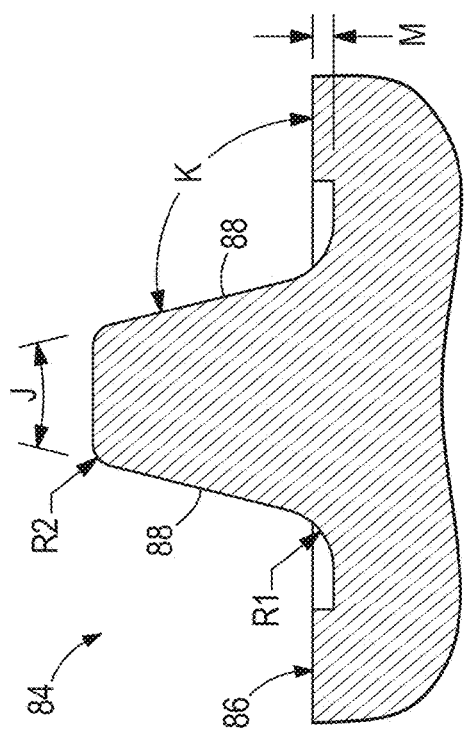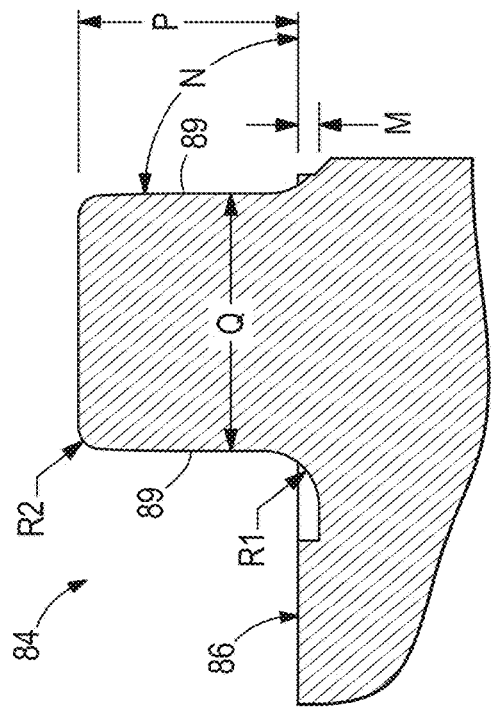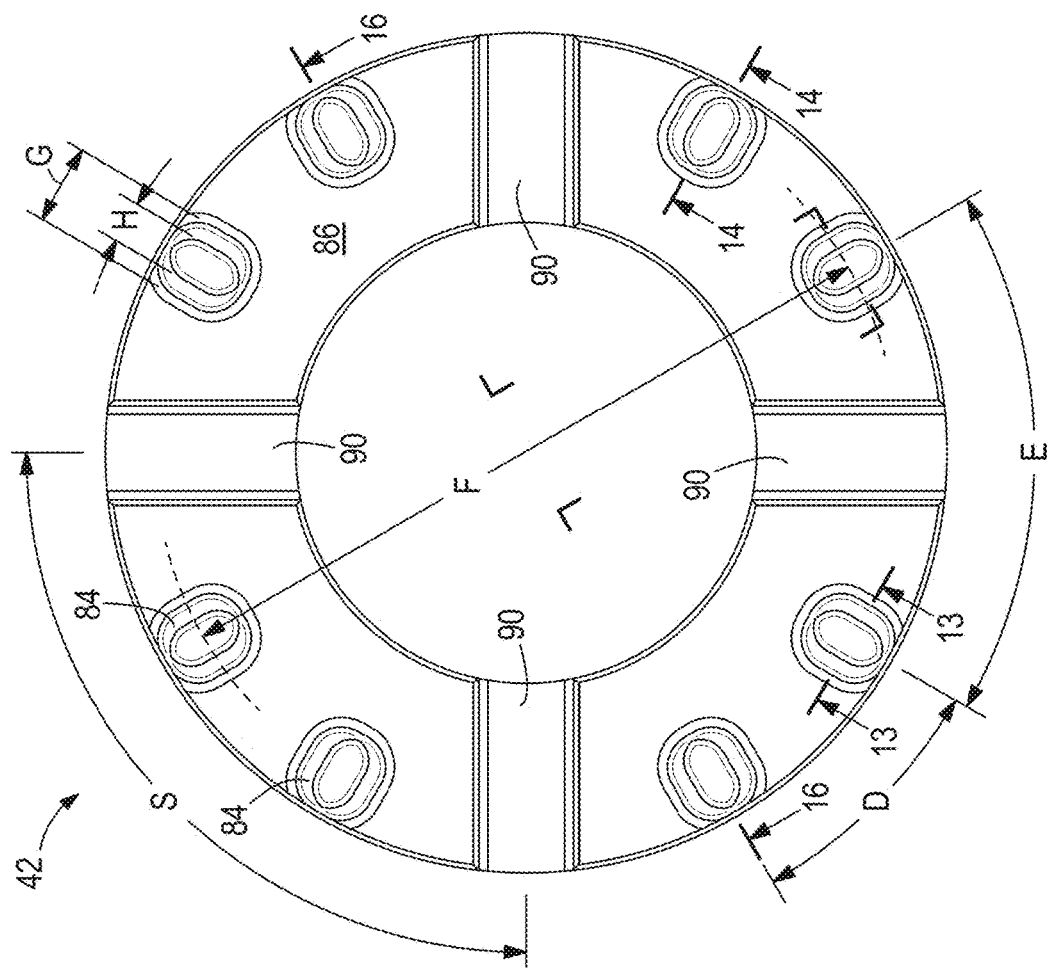

OSCILLATING MULTI-TOOL SYSTEM

CROSS REFERENCE TO RELATED APPLICATIONS

This application is a continuation of U.S. patent application Ser. No. 17/162,823, filed Jan. 29, 2021, which is a continuation of U.S. patent application Ser. No. 16/200,111, filed Nov. 26, 2018, which is a continuation of U.S. patent application Ser. No. 15/413,815, filed Jan. 24, 2017, now U.S. Pat. No. 10,137,592, which is a continuation of U.S. patent application Ser. No. 14/270,560, filed May 6, 2014, now U.S. Pat. No. 9,555,554, which claims priority to U.S. Provisional Patent Application No. 61/820,018 filed on May 6, 2013, the entire contents of all of which are incorporated herein by reference.

BACKGROUND

The present invention relates to power tools driven by an electric motor. Power tools utilize the rotation of a motor to provide useful torque for operations such as cutting, sanding, grinding, removing material, drilling, driving fasteners, and the like. For example, the invention relates to an oscillating power tool.

Oscillating power tools can be utilized with various accessories, such as blades and sanding or grinding pad attachments, for performing different functions. For example, a plunge cut blade may be attached to the output, or tool holder, of the oscillating tool to perform a plunge cut. Then, a user may remove the plunge cut blade and attach a sanding pad to the tool holder for performing a sanding operation. Conventionally, the accessories can be interchanged by inserting and removing a fastener, such as a screw, which may be tightened with a tool, such as a hex key, to provide a clamping force to secure the accessory to the tool holder.

SUMMARY

In one aspect, the invention provides an oscillating power tool. The oscillating power tool includes a housing, a motor disposed within the housing, a tool holder configured to be driven oscillatingly about an output axis by the motor, and a flange configured to clamp an output element onto the tool holder. The flange is configured to be movable in an axial direction defined by the output axis. The oscillating power tool also includes a plunger operably coupled for movement with the flange in the axial direction. The plunger and the flange are threadedly coupled to each other. The oscillating power tool also includes a lever configured to actuate the flange, the lever being pivotable between a clamping position and a release position. The flange is configured to clamp the output element onto the tool holder in the clamping position, and the flange is configured to be displaced a first distance from the tool holder in the release position. The lever includes a cam surface including a substantially flat surface, the substantially flat surface configured to engage the plunger in the release position. In the release position, a gap is disposed between the lever and the housing to allow the lever to be rotated past the release position. The lever is configured to displace the flange a second distance from the tool holder when rotated past the release position. The second distance is larger than the first distance.

In another aspect, the invention provides an oscillating power tool including a housing, a motor disposed within the housing, a tool holder configured to be driven oscillatingly about an output axis by the motor, and a flange configured to clamp an output element onto the tool holder. The flange is configured to be movable in an axial direction defined by the output axis. The oscillating power tool also includes a spring configured to provide a clamping force for clamping the output element, a plunger operably coupled for movement with the flange in the axial direction, and a lever configured to actuate the flange. The lever is pivotable between a clamping position and a release position. The flange is configured to clamp the output element onto the tool holder in the clamping position. The flange is configured to be displaced a first distance from the tool holder in the release position. The clamping force is at least partially relieved in the release position. The lever includes a cam surface including a substantially flat surface, the substantially flat surface configured to engage the plunger in the release position. The lever is configured to rest in the release position. In the release position, a gap is disposed between the lever and the housing to allow the lever to be rotated past the release position. The lever is configured to further relieve the clamping force when rotated past the release position.

In another aspect, the invention provides an oscillating power tool including a housing, a motor disposed within the housing, a tool holder configured to be driven oscillatingly about an output axis by the motor, and a flange configured to clamp an output element onto the tool holder. The flange is configured to be movable in an axial direction defined by the output axis. The oscillating power tool also includes a spring configured to provide a clamping force for clamping the output element, a plunger operably coupled for movement with the flange in the axial direction, and a lever configured to actuate the flange, the lever being pivotable between a clamping position and a release position. The flange is configured to clamp the output element onto the tool holder in the clamping position. The flange is configured to be displaced a first distance from the tool holder in the release position. The clamping force is at least partially relieved in the release position. The lever includes a cam surface defining a detent such that the lever is configured to rest in the release position by way of the detent. In the release position, a gap is disposed between the lever and the housing to allow the lever to be rotated past the release position. The lever is configured to further relieve the clamping force when rotated past the release position.

Other aspects of the invention will become apparent by consideration of the detailed description and accompanying drawings.

BRIEF DESCRIPTION OF THE DRAWINGS

FIG. 12 is a bottom view of a tool holder of the power tool shown in FIG. 1.

FIG. 13 is a cross section view of a portion of the tool holder taken along line 13-13 in FIG. 12.

FIG. 14 is a cross section view of a portion of the tool holder taken along line 14-14 in FIG. 12.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it should be understood that the phraseology and terminology used herein are for the purpose of description and should not be regarded as limiting.

DETAILED DESCRIPTION

Figure 1:
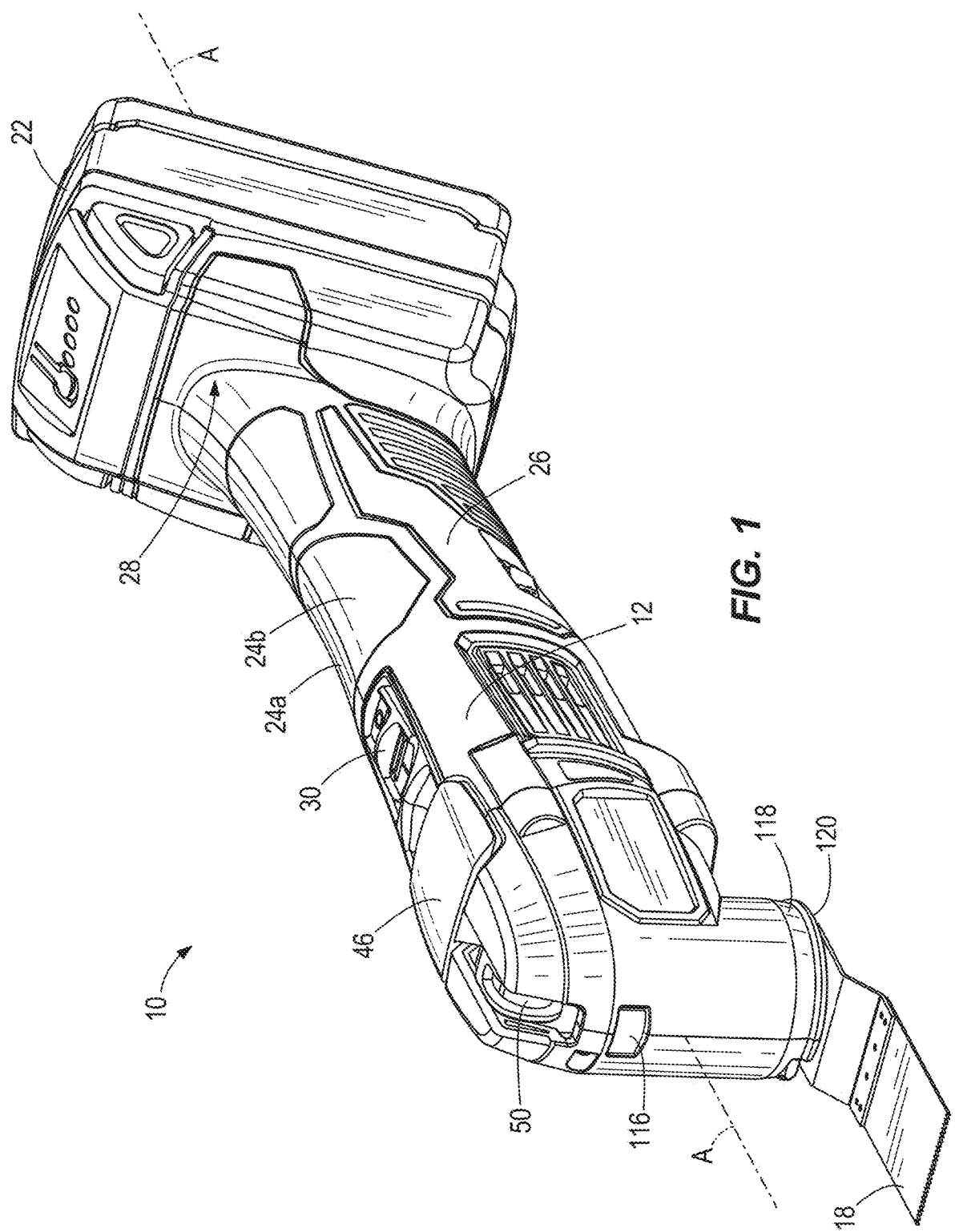
FIG. 1 is a top perspective view of a power tool according to one construction of the invention.
Figure 2:
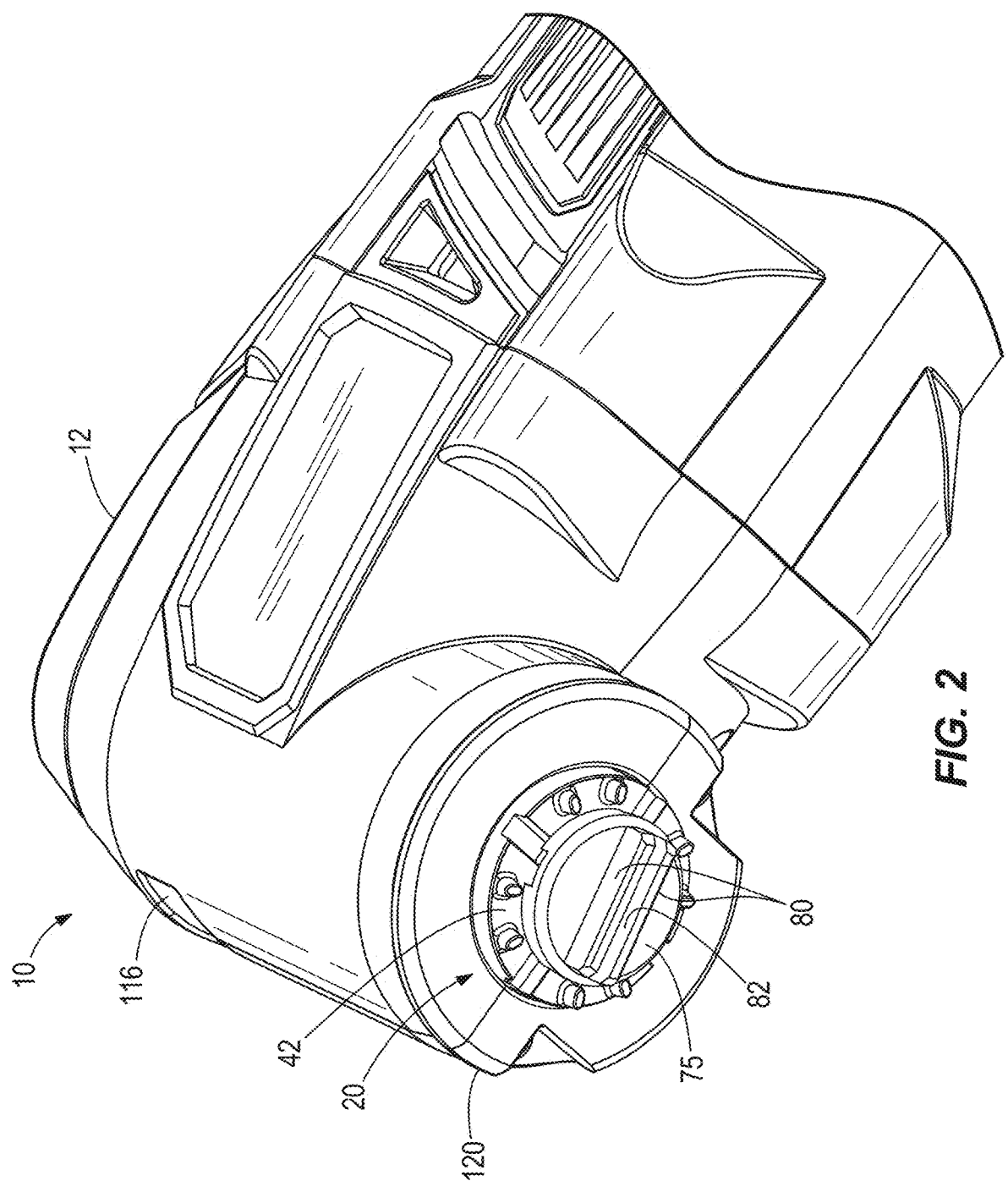
FIG. 2 is a bottom perspective view of a portion of the power tool of FIG. 1.
Figure 3:
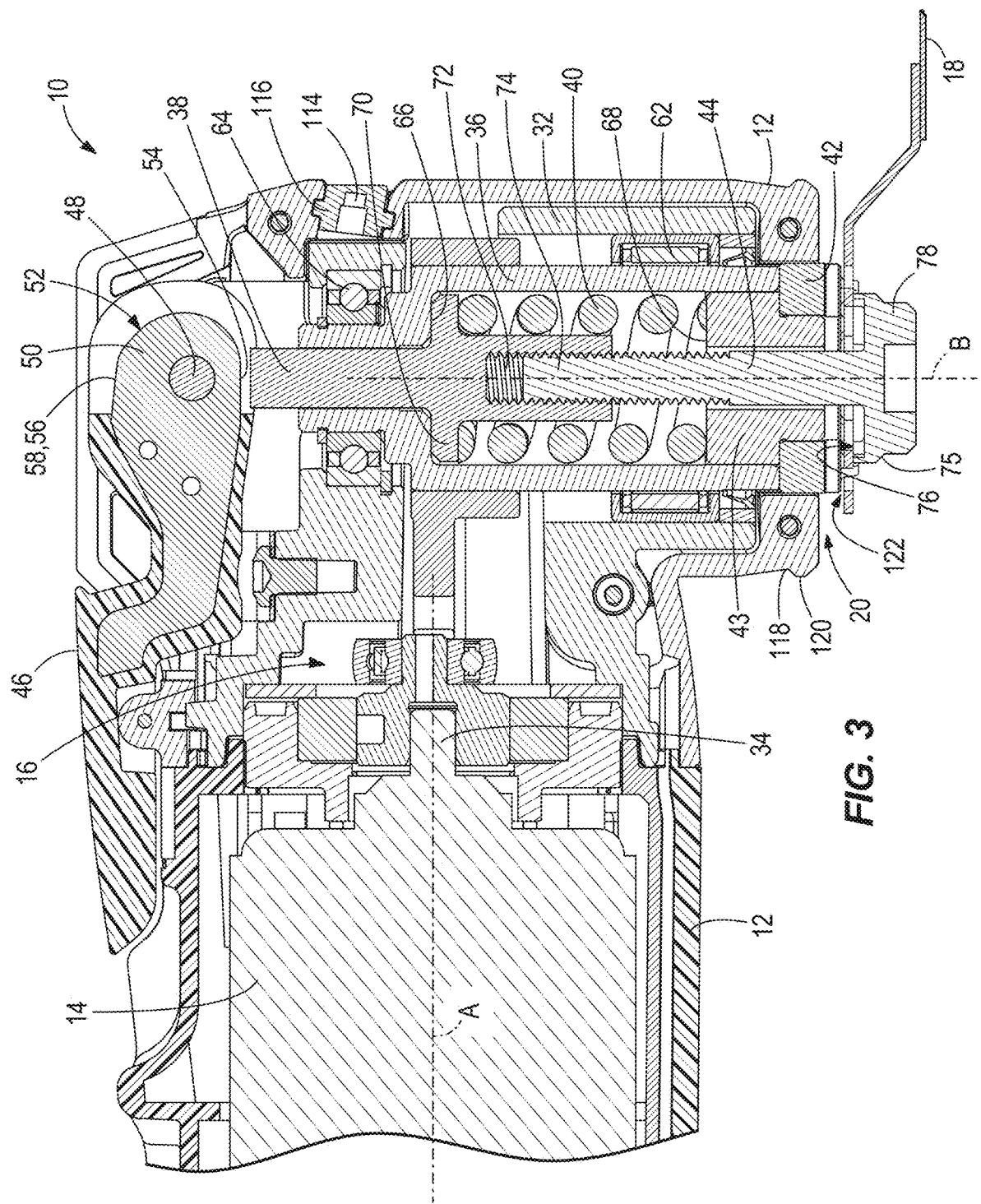
FIG. 3 is a cross section view of a portion of the power tool shown in FIG. 1.

FIGS. 1-44 illustrate power tool 10, such as an oscillating tool, according to one construction of the invention. With reference to FIGS. 1-3, the power tool 10 includes a housing 12, a motor 14, a drive mechanism 16, an output element 18, a clamping mechanism 20, and a power source 22, such as a battery pack, for powering the motor 14. In the illustrated construction, the motor 14 is an electric motor. In other constructions, the motor 14 may be pneumatically powered by compressed air passing through a pneumatic motor. In some constructions, a variable speed or multi-speed motor may be employed. In other constructions, the power tool 10 may be powered by an AC power source by way of a cord (not shown). In other constructions, other suitable motors and power sources may be employed.

The housing 12 includes two clamshell halves 24a, 24b that are coupled together to enclose the motor 14 and the drive mechanism 16. When connected together, the clamshell halves 24a, 24b define a handle portion 26 and a battery support portion 28 of the housing 12. The handle portion 26 is configured to be grasped by a user during operation of the power tool 10. An actuator 30 is coupled with the handle portion 26 of the housing 12 for switching the motor 14 between an on (i.e., energized) position and an off position. In some constructions, a separate actuator may be employed for changing the motor speed. In other constructions, the actuator 30 may additionally be operable to switch the motor 14 between various speeds of operation. In the illustrated construction, the actuator 30 is a sliding actuator that is slideable with respect to the housing 12 in a direction generally parallel to a longitudinal axis A of the handle portion 26. In other constructions, the actuator 30 may be moveable in other directions and may have other configurations, such as a trigger-style actuator, a depressible button, a lever, a rotating actuator, a paddle actuator, etc. The battery support portion 28 is configured to support the battery pack 22 on the housing 12.

The battery pack 22 is connected to the battery support portion 28 of the housing 12 and electrically coupled to the motor 14. During operation of the power tool 10, the battery pack 22 supplies power to the motor 14 to energize the motor. In the illustrated construction, the battery pack 22 is a slide-on-style battery pack that includes two parallel, spaced apart rails (not shown). The rails engage corresponding grooves (not shown) on another part of the power tool 10 to support the battery pack 22 on the housing 12. In other embodiments, the battery pack 22 may be a tower-style battery pack that is at least partially inserted into the housing 12. The illustrated battery pack 22 is an 18-volt Li-ion power tool battery pack. In other embodiments, the battery pack 22 may have different voltages (e.g., 12 volts, 14.4 volts, 28 volts etc.) and/or chemistries (e.g., NiCd, NiMH, etc.).

The motor 14 and the drive mechanism 16 are positioned substantially within the housing 12 in front of the handle portion 26. In some embodiments, the drive mechanism 16 may be positioned within a gear case 32 inside of and/or supported by the housing 12. The motor 14 includes a drive shaft 34. The drive mechanism 16 is coupled to the motor 14 to be driven by the motor 14 by way of the drive shaft 34. The drive mechanism 16 converts rotational motion of the drive shaft 34 into oscillating motion of the output element 18 rotationally about an axis. In other constructions, the power tool may have a drive mechanism that rotates, reciprocates, or imparts an orbital motion to the output element 18.

The output element 18 is coupled to an output shaft, or spindle 36, of the drive mechanism 16. The illustrated output element 18 is located at an opposite end of the housing 12 from the battery pack 22, but may alternatively be located in other locations on the housing 12 relative to the battery pack 22. In the illustrated construction, the spindle 36 defines an output axis B substantially perpendicular to the longitudinal axis A. When energized, the motor 14 drives the drive mechanism 16 to oscillate the spindle 36 and the output element 18. In the illustrated construction, the output element 18 is a cutting blade that is oscillated during operation of the power tool 10. In other constructions, the output element 18 may be a different type of blade such as a scraper blade, a circular blade, a semi-circular blade, etc., or a different type of element such as a sanding pad, a grinding element, etc.

The clamping mechanism 20 clamps the output element 18 to the spindle 36. In the illustrated construction, the clamping mechanism 20 is a tool-less clamping mechanism that allows a user to attach, remove, and exchange output elements without the use of a tool (toollessly). The clamping mechanism 20 includes the spindle 36, a plunger 38, a spring 40, a tool holder 42, and a clamp shaft 44, which will be described in greater detail below. A lever 46 is actutable by a user to operate the clamping mechanism 20.

Figure 6:
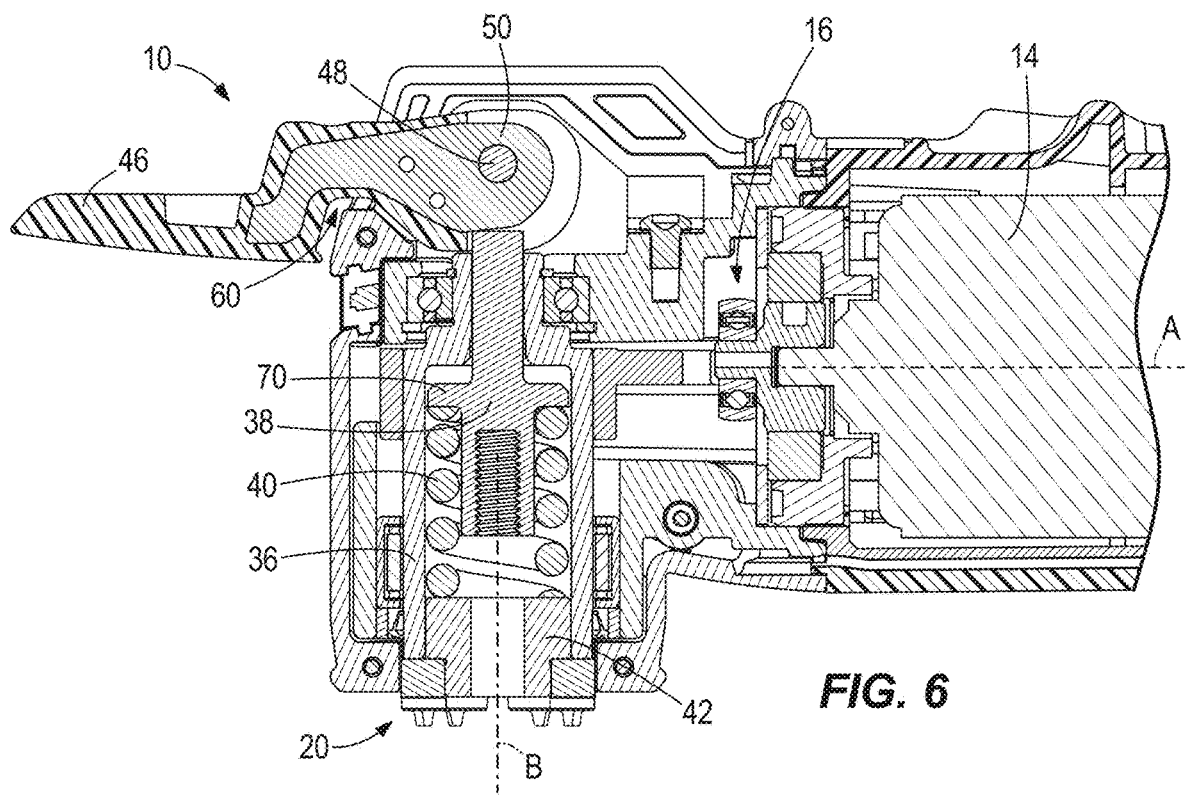
FIG. 6 is a cross section view illustrating the clamping mechanism of the power tool of FIG. 1, the clamping mechanism shown in a release position and having a clamp shaft removed.
Figure 7:
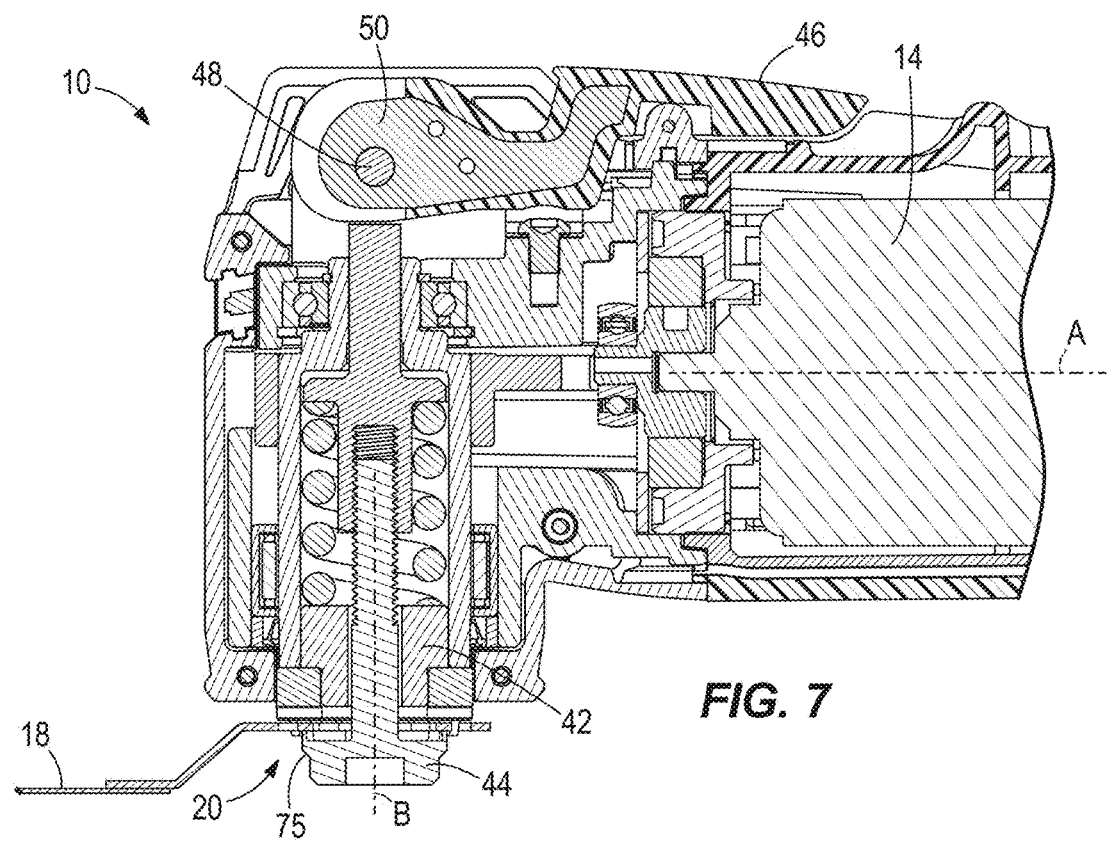
FIG. 7 is a cross section view illustrating the clamping mechanism of the power tool of FIG. 1, the clamping mechanism shown in a clamping position and having a blade attached thereto.
Figure 8:
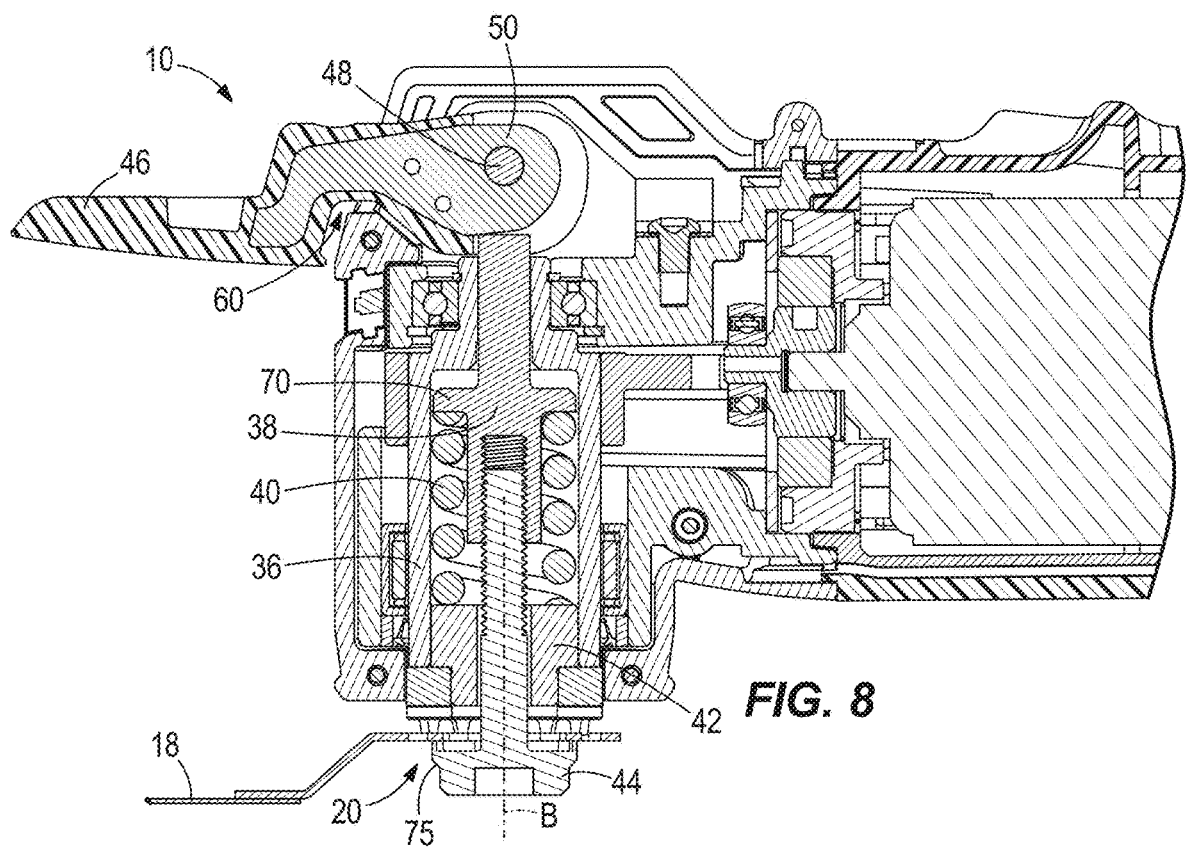
FIG. 8 is a cross section view illustrating the clamping mechanism of the power tool of FIG. 1, the clamping mechanism shown in a release position and having the blade attached thereto.
Figure 9:
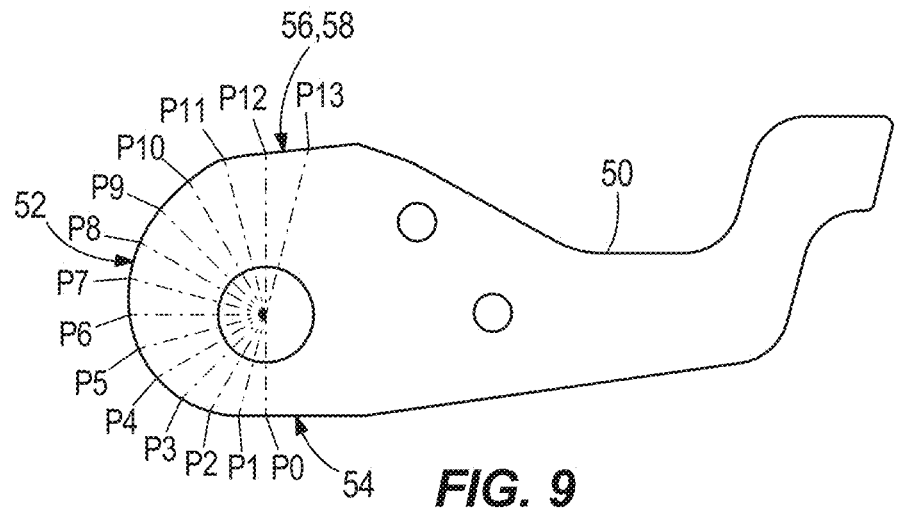
FIG. 9 is a side view of a cam portion of the lever shown in FIG. 4.
Figure 10:
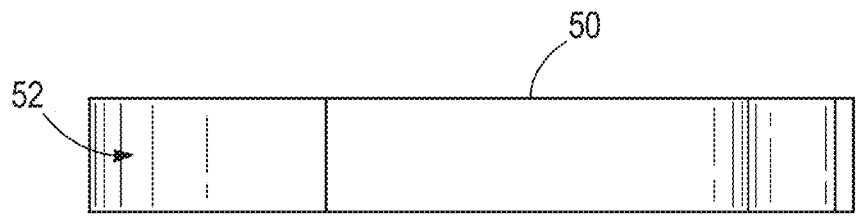
FIG. 10 is a top view of the cam portion of FIG. 9.
Figure 11:
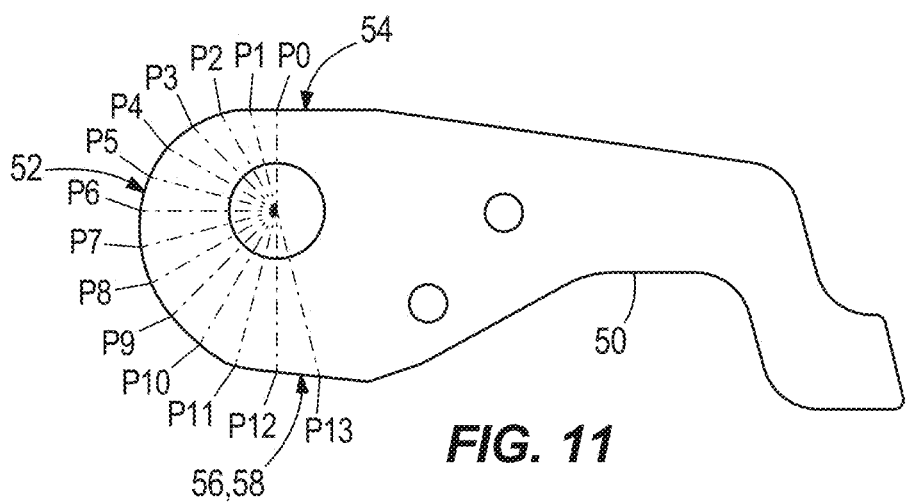
FIG. 11 is a rear view of the cam portion of FIG. 9.

The lever 46 is pivotable about a pin 48, which defines a pivot axis C, between a clamping position (FIGS. 3, 5, and 7) and a release position (FIGS. 6 and 8). In the clamping position, the output element 18 is secured, or clamped, to the tool holder 42. In the release position, the clamp shaft 44 may be removed such that the output element 18 may be removed or exchanged, as will be described in greater detail below. The lever 46 includes a cam 50 for displacing the plunger 38. In the clamping position, the cam 50 does not engage the plunger 38. In the release position, the cam 50 engages the plunger 38 to displace the plunger 38, as will be described in greater detail below.

As illustrated in FIGS. 4 and 9-11, the cam 50 includes a cam surface 52 having radii at surface points P0-P13 on the cam surface 52. The radii range from about 5.35 mm (0.211 in.) at surface point P0 to about 8.85 mm (0.348 in.) at surface point P13. The cam surface 52 between surface points P0 and P13 extends about 195 degrees about the pivot axis C. Table 1 below provides the radius and angle of each surface point P0 through P13. Surface points P0 and P1 are disposed on a first substantially flat surface 54 of the cam 50. In the clamping position, surface points P0 and P1 are located adjacent the plunger 38 and do not engage the plunger 38. As the lever 46 is rotated from the clamping position to the release position, the cam surface 52 begins to engage the plunger 38 and then to displace the plunger 38. The lever 46 rotates about 170 degrees between the clamping position and the release position. Between surface points P11 and P13, (e.g., at or near surface point P11 or P12), the cam surface 52 flattens into a second substantially flat surface 56, which provides a detent 58 during movement of the lever 46. When the lever 46 is in the release position, the lever 46 rests at or after the detent 58 because the radius before and after the detent 58 is greater than the radius at the detent 58 (see radius measurements of the surface points P11-P13 in Table 1), inhibiting movement of the lever 46 out of the release position.

TABLE 1

| Surface Position | Angle (degrees) | Radius (mm) | Radius (in.) |
| --- | --- | --- | --- |
| P0 | 1 | 5.347 | 0.211 |
| P1 | 15 | 5.535 | 0.218 |
| P2 | 30 | 5.915 | 0.233 |
| P3 | 45 | 6.293 | 0.248 |
| P4 | 60 | 6.665 | 0.262 |
| P5 | 75 | 6.962 | 0.274 |
| P6 | 90 | 7.211 | 0.284 |
| P7 | 105 | 7.447 | 0.293 |
| P8 | 120 | 7.673 | 0.302 |
| P9 | 135 | 7.889 | 0.311 |
| P10 | 150 | 8.164 | 0.321 |
| P11 | 165 | 8.502 | 0.335 |
| P12 | 180 | 8.487 | 0.334 |
| P13 | 195 | 8.845 | 0.348 |

In the release position (FIGS. 6 and 8), a gap 60 remains between the lever 46 and the housing 12 to allow the lever 46 to be rotated past the detent 58 (e.g., to travel more than 170 degrees). Rotating the lever 46 past the detent 58 further displaces the plunger 38 in the event that extra plunger displacement is needed to assist with releasing the output element 18. For example, at surface point P13, the radius is about 8.85 mm (0.348 in.), which is greater than the radius at the release position (at or near surface point P11 or P12), which is about 8.48 mm (0.334 in.) Thus, rotating the lever 46 past the detent 58 further displaces the plunger 38. However, a user must hold the lever 46 past the detent 58 to maintain the lever 46 past the release position as the lever 46 is biased to the release position when the lever 46 is past the release position.

The clamping mechanism 20 includes the spindle 36, the plunger 38, the spring 40, the tool holder 42, and the clamp shaft 44. In the illustrated construction, the spindle 36 is journalled to the gear case 32 by way of a needle bearing 62 and a rear bearing 64 to allow the spindle 36 to oscillate with respect to the gear case 32. Furthermore, the needle bearing 62 is press fit to the gear case 32, the rear bearing 64 is press fit to the gear case 32, the tool holder 42 is press fit to an intermediate member 43, which is press fit to the spindle 36, and a portion of the drive mechanism 16 (e.g., a fork which will be described in greater detail below) is press fit to the spindle 36. In other constructions, the components of the clamping mechanism 20 may be coupled or fastened in other suitable ways.

The clamping mechanism 20 also includes an upper shoulder 66 and a lower shoulder 68 (FIG. 3) that are generally disposed inside the spindle 36, which is hollow. In the illustrated construction, the upper shoulder 66 is formed on an inner surface of the spindle 36 and the lower shoulder 68 is formed on an inner surface of the intermediate member 43. In other constructions, the upper and lower shoulders 66, 68 may be formed with other components of the clamping mechanism 20. In other constructions, the tool holder 42 and the intermediate member 43 may be formed as a single piece.

The plunger 38 includes a plunger shoulder 70, configured as a flange in the illustrated construction, which is disposed adjacent the upper shoulder 66. The spring 40 is disposed between the lower shoulder 68 (e.g., the tool holder) and the plunger shoulder 70 (e.g., the plunger 38). The plunger 38 includes a threaded bore 72, which receives the clamp shaft 44.

The clamp shaft 44 includes a threaded shaft 74, which is threadably received in the threaded bore 72 of the plunger 38. The threaded shaft 74 is configured as a double lead screw (e.g., having two threads instead of a single thread) such that half as many turns are required to advance the clamp shaft 44 a given distance as with a single lead screw. The threaded shaft 74 has a sufficient coefficient of friction so as to be self-locking.

The clamp shaft 44 is fixedly coupled to a flange 75 having a face 76 for engaging the output element 18 to apply a clamping force to the output element 18. The flange 75 includes a tab 78 for finger tightening the clamp shaft 44 onto the threaded bore 72 of the plunger 38 by way of the threaded engagement therebetween. The tab 78 projects from the flange 75 and provides opposing surfaces 80 opposed about an axis of rotation (which coincides with output axis B) and engageable by a user to rotate and tighten or loosen the clamp shaft 44. The opposing surfaces are substantially planar and extend in planes substantially parallel to the output axis B. The tab 78 projects from the flange 75 substantially from a diameter defined by the flange 75. The tab 78 also includes a slot 82 sized to receive a tool (e.g., a flat head screwdriver or an output element 18) for further tightening or loosening of the clamp shaft 44 if desired.

In the clamping position, the spring 40 provides the clamping force that holds the output element 18 between the face 76 of the clamp shaft 44 and the tool holder 42 tightly. In the illustrated construction, the spring 40 is a compression spring formed into a cylindrical shape from round music wire having a diameter of about 0.16 inches. The spring material is preferably shot peened and is preset. Preferably, the spring 40 has a spring rate of about 1300 lbf/in and provides about 275 lbs of clamping force. In other constructions, other types of springs having other materials, configurations, shapes, and properties may be employed.

Figure 4:
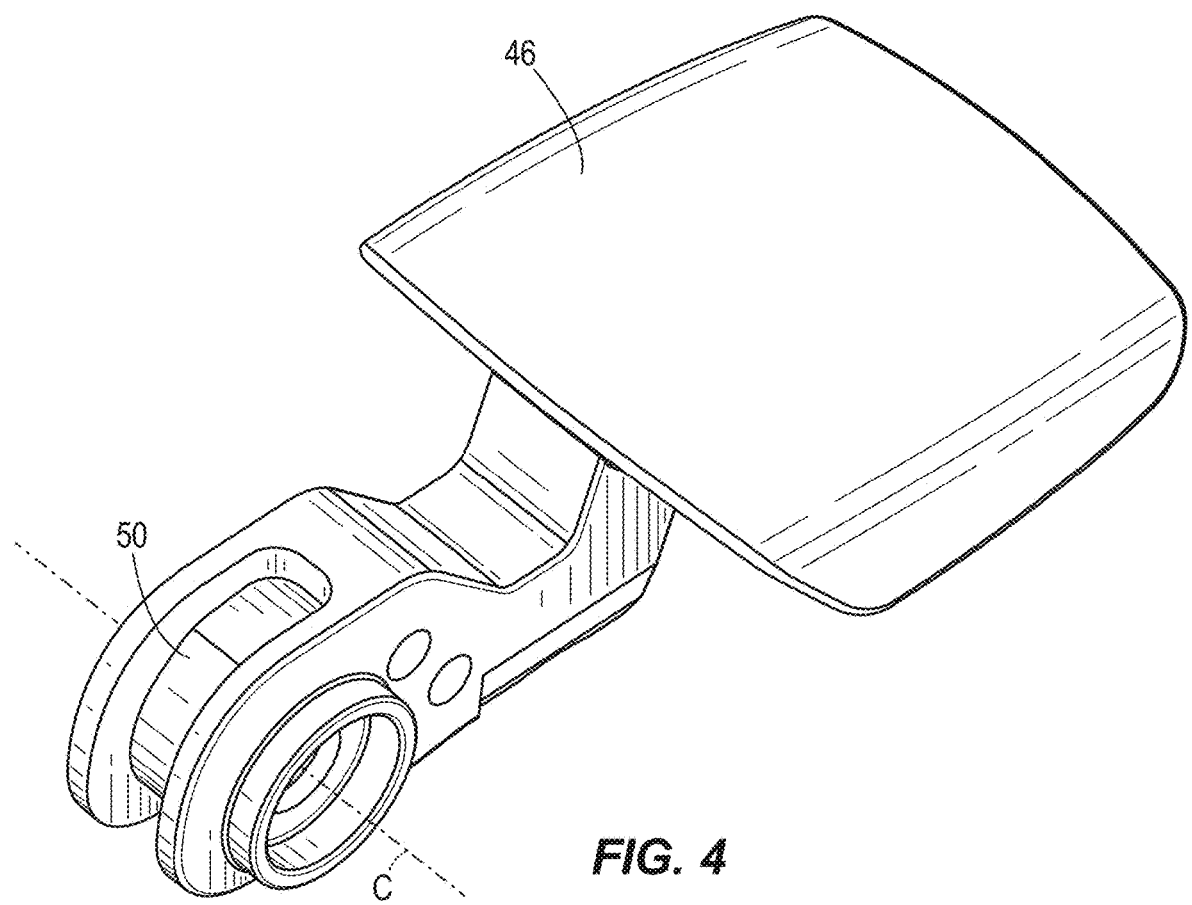
FIG. 4 is a perspective view of a lever, which is a portion of the power tool of FIG. 1.
Figure 5:
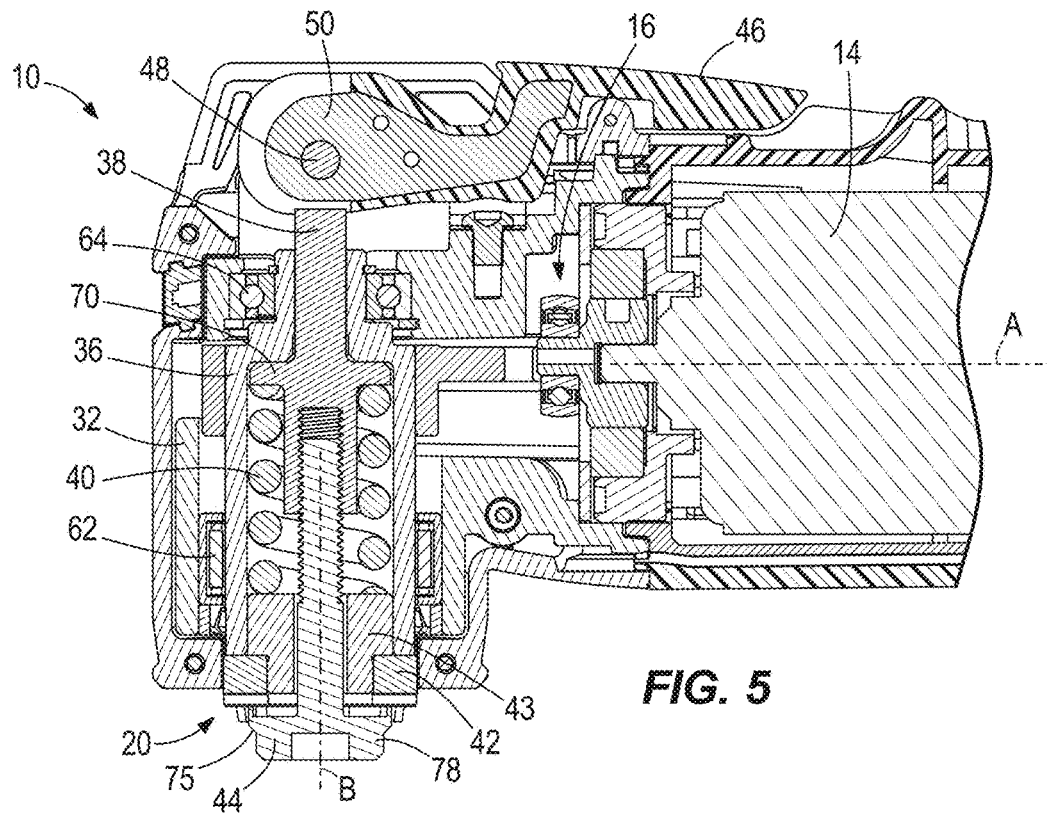
FIG. 5 is a cross section view illustrating a clamping mechanism of the power tool of FIG. 1, the clamping mechanism shown in a clamping position.

In the clamping position (FIGS. 3, 4 and 6), the lever 46 does not engage the plunger 38 so that the clamping mechanism 20 can oscillate freely while the motor 14 is energized without friction between the plunger 38 and the lever 46. Furthermore, the spring 40 is compressed between the plunger shoulder 70 and the lower shoulder 68 to provide the clamping force. The lower shoulder 68 of the tool holder 42 is fixed such that the clamping force of the spring 40 acts to displace the plunger 38 towards the cam 50. In turn, the clamp shaft 44 is fixed to the plunger 38 (by way of the self-locking threaded engagement described above) such that the clamping force of the spring 40 acts to displace the face 76 of the flange 75 towards the tool holder 42 (FIG. 4). When the output element 18 is installed between the face 76 of the flange 75 and the tool holder 42 and the lever 46 is in the clamping position, the face 76 of the flange 75 engages a face 47 (FIG. 16) of the output element 18 to apply the clamping force so that the output element 18 is clamped between the flange 75 and the tool holder 42 by the clamping force of the spring (FIGS. 3 and 6).

In the release position (FIGS. 6 and 8), the lever 46 engages the plunger 38 (as described in greater detail above) to displace the plunger 38 away from the lever 46. The lever 46 rests at the detent 58, thereby relieving the clamping force from the output element 18. While the lever 46 is in the release position, or while the user holds the lever 46 past the release position (as described above), the user may loosen and remove the clamp shaft 44 from the plunger 68 by grasping the opposing surfaces 80 of the tab 78 by hand or with the use of a tool in the slot 82, if desired, to apply a torque to the clamp shaft 44. When the clamp shaft 44 is removed, the output element 18 may be removed and replaced, if desired. Then, the clamp shaft 44 may be hand-tightened (or tightened by a tool, if desired) into the threaded bore 72 of the plunger 38 and the lever 46 returned to the clamping position to return the clamping force onto the tool holder 42.

Figure 15:
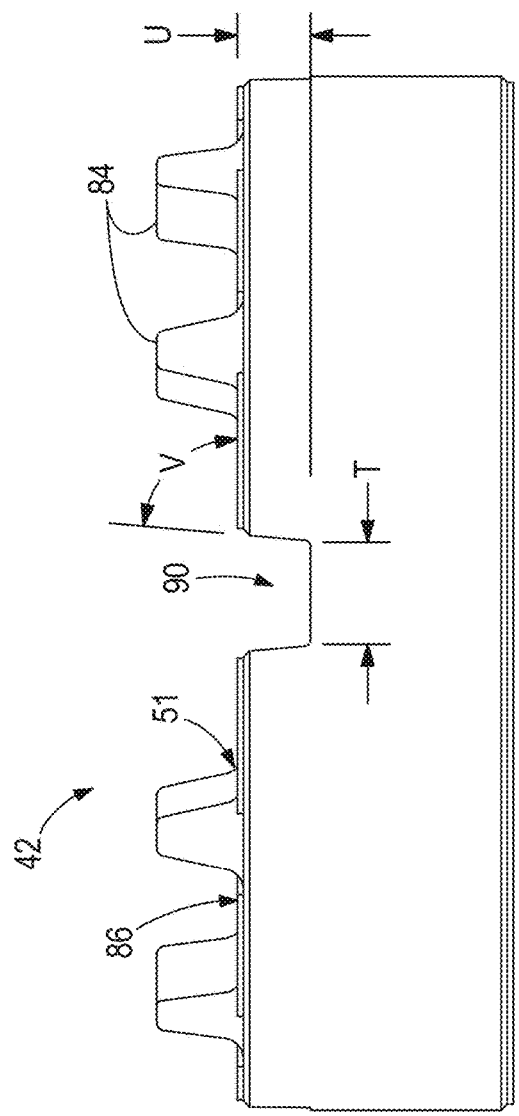
FIG. 15 is a side view of the tool holder of FIG. 12.
Figure 16:
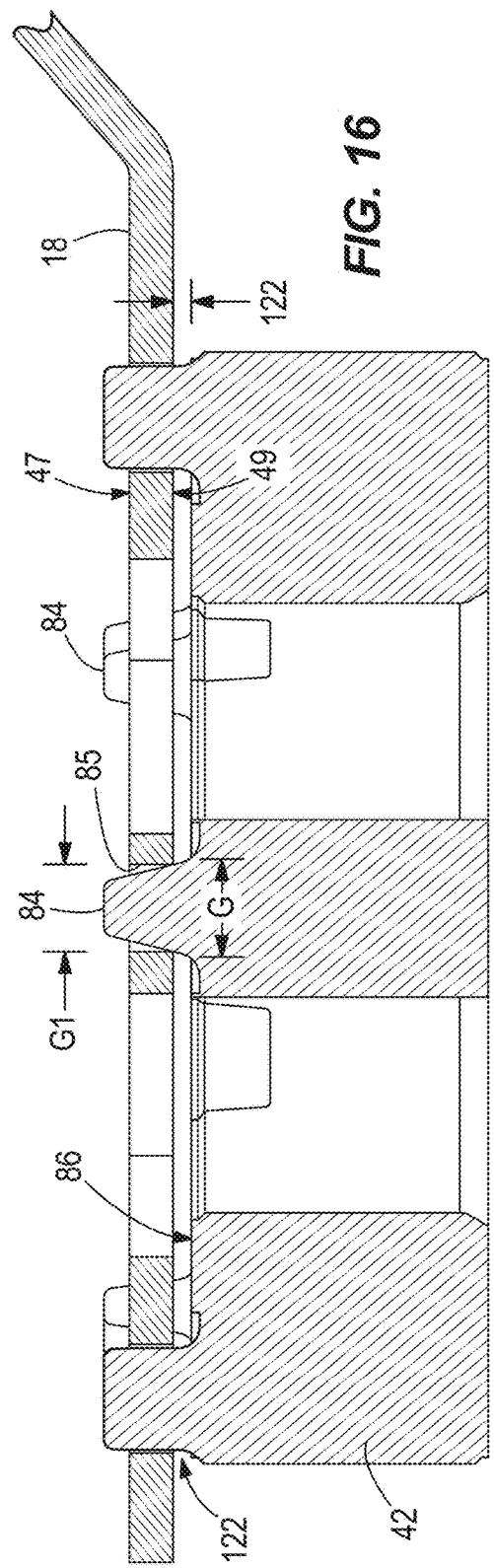
FIG. 16 is a cross section view of the tool holder taken along broken line 16-16 in FIG. 12.
Figure 17:
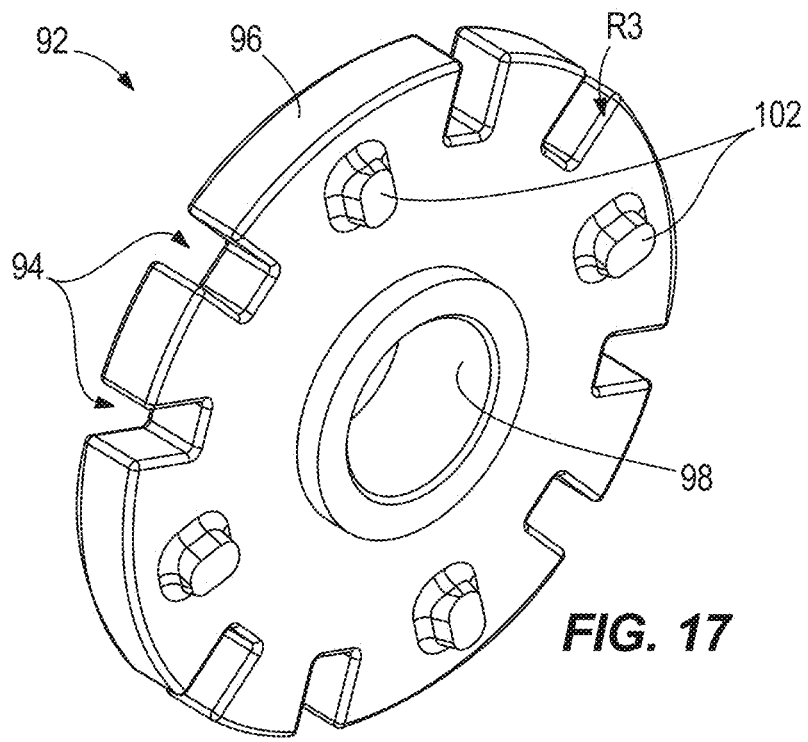
FIG. 17 is a bottom perspective view of an adapter for use with the power tool of FIG. 1.

As illustrated in FIGS. 12-16, the tool holder 42 includes tapered locating features 84 (some or all of which are substantially identical) projecting from an outer surface 86 of the tool holder 42 for engaging the output element 18. The locating features 84 are received by apertures 85 (FIG. 16) in the output element 18. In the illustrated construction, the tool holder 42 includes eight locating features 84 spaced angularly on the outer surface 86 in four groups of two in substantially a circle about the output axis B. The locating features 84 in a group of two are spaced from each other by an angle D of about 30 degrees. Each of the four groups of two locating features 84 is spaced from an adjacent group of two locating features 84 by an angle E of about 60 degrees. The flange 75 is disposed substantially within the circle defined by the radial distance of the locating features 84. The locating features 84 are diametrically opposed from each other by a distance F of about 25.5 mm (1.00 in.) Each locating feature 84 is tapered to provide substantially a zero-clearance fit with the apertures 85 in the output element 18 (as shown in FIG. 16) in at least a circumferential direction so as to transfer oscillating motion to the output element 18 without substantial losses or wiggling therebetween. Each locating feature 84 has a base width G of about 2.20 mm (0.0866 in.) and a top width H of about 0.90 mm (0.035 in.) The base width is preferably greater than about 0.075 inches and less than about 0.095 inches. The base width G is defined as the shortest distance from the first sidewall to the second sidewall at a base 51 (FIG. 15) of the locating feature 84, i.e., the distance from the first sidewall to the second sidewall at the base 51 that is tangential to a circumferential or angular arc (e.g., the circle discussed above) about the output axis B. The base 51 of the locating feature 84 is defined where the locating feature 84 substantially meets a plane defined by the outer surface 86 of the tool holder 42.

At least some of the apertures 85 have a width G1 that corresponds with a respective base width G of the locating feature 84 with which it is mated in the clamping position, as illustrated in FIG. 16. In the illustrated construction, the width G1 is about 1.9 mm (0.075 in.) In other constructions, the width G1 may be between about 1.0 mm (0.039 in.) and about 2.19 mm (0.0862 in.) Preferably, the width G1 is between about 1.7 mm (0.067 in.) and about 2.1 mm (0.083 in.) The width G1 is substantially smaller than the base with G such that a face 49 of the output element 18 facing the outer surface 86 of the tool holder 42 is offset from the outer surface 86 of the tool holder 42 by a gap 122, which will be described in greater detail below. Therefore, in other constructions in which the locating features 84 on the tool holder 42 have other sizes, dimensions, and shapes, the size of the width G1 may be adapted to be substantially smaller than the base width G of the locating features 84 to achieve a similar fit and the gap 122.

Figure 19:
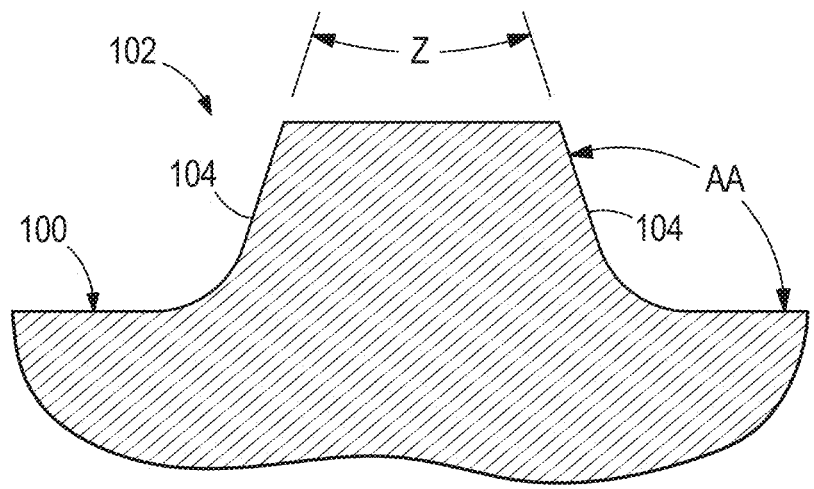
FIG. 19 is a cross section view of a portion of the adapter taken along line 19-19 in FIG. 18.

FIG. 13 illustrates a cross section through one of the locating features 84 showing the taper in the circumferential direction. The locating feature 84 has a circumferential taper angle J of about 28 degrees included between circumferential sidewalls 88 such that a circumferential sidewall has an angle K with respect to the outer surface 86 of about 104 degrees. The sidewalls 88 are tapered because the angle K is greater than 90 degrees. In some constructions, the angle K is greater than or less than 104 degrees, but greater than 90 degrees. Preferably, the angle K is between about 100 degrees and about 109 degrees. The locating feature 84 has a bottom radius R1 of about 0.20 mm (0.0079 in.) and a top radius R2 of about 0.20 mm (0.0079 in.) In other constructions, the top radius R2 may be replaced with a flat corner (e.g., as illustrated in FIG. 19, which will be described in greater detail below). In the illustrated construction, the locating feature 84 is sunken with respect to the outer surface 86 by a distance M of about 0.20 mm (0.0079 in.) In other constructions, the locating feature 84 need not be sunken with respect to the outer surface 86 and may be flush with the outer surface 86. In the illustrated construction, the locating features 84 are substantially tapered from the base 51 to the top radius R2. In other constructions, the locating features 84 may be only partially tapered from base to tip.

FIG. 14 illustrates a cross section through one of the locating features 84 showing the taper in a radial direction. In the illustrated construction, the locating feature 84 is substantially not tapered in the radial direction such that radial sidewalls 89 are substantially parallel and have an angle N with respect to the outer surface 86 of about 90 degrees. Essentially, the locating feature 84 is not tapered in the radial direction; however, in other constructions, the locating feature 84 may be tapered in the radial direction (e.g., such that the angle N is greater than 90 degrees) as well as the circumferential direction. FIG. 14 also illustrates a height P of the locating feature 84, which is about 2.0 mm (0.079 in.) with respect to the outer surface 86. The locating feature 84 has a length Q of about 2.35 mm (0.0925 in.) Thus the overall shape of each locating feature 84 is substantially a truncated pyramid.

As illustrated in FIGS. 12 and 15, the tool holder 42 also includes four radial grooves 90 spaced from each adjacent radial groove 90 by an angle S of about 90 degrees. Each radial groove 90 has a recessed base 91 with a base width T of about 2.26 mm (0.0890 in.), a depth U of about 1.80 mm (0.0709 in.) from the outer surface 86, and is tapered inwards by a taper angle V of about 85 degrees with respect to the outer surface 86.

As illustrated in FIG. 16, the output element 18 is fully engaged with the tool holder 42. The output element 18 is fully engaged with the tool holder 42 when the locating features 84 are fully received in the apertures 85, i.e., when the output element 18 is wedged onto the locating features 84 such that the locating features 84 are received by the apertures 85 and the output element 18 is inhibited from moving closer to the outer surface 86 by the increased base width G of the locating feature 84 with respect to the corresponding width G1 of the aperture 85 of the output element 18. When the output element 18 is fully received, the output element 18 substantially does not engage the bases 51 of the locating features 84. When the clamping force is at least partially applied to the output element 18, the clamping force is allocated towards more tightly holding the output element 18 on the tool holder 42. By way of the increased base width G of the locating feature 84 with respect to the corresponding width G1 of the aperture 85 of the output element 18, it is ensured that the output element 18 is securely engaged in a driving relationship with the tool holder 42, e.g., by minimizing losses such as wiggle or vibrations when the tool holder 42 drives the output element 18, without the need for the added clamping force of a tool-tightened fastener. Thus, the invention provides a tool holder capable of securely driving an output element with only the clamping force of a toolless clamping mechanism (e.g., the clamping force of a spring).

Figure 18:
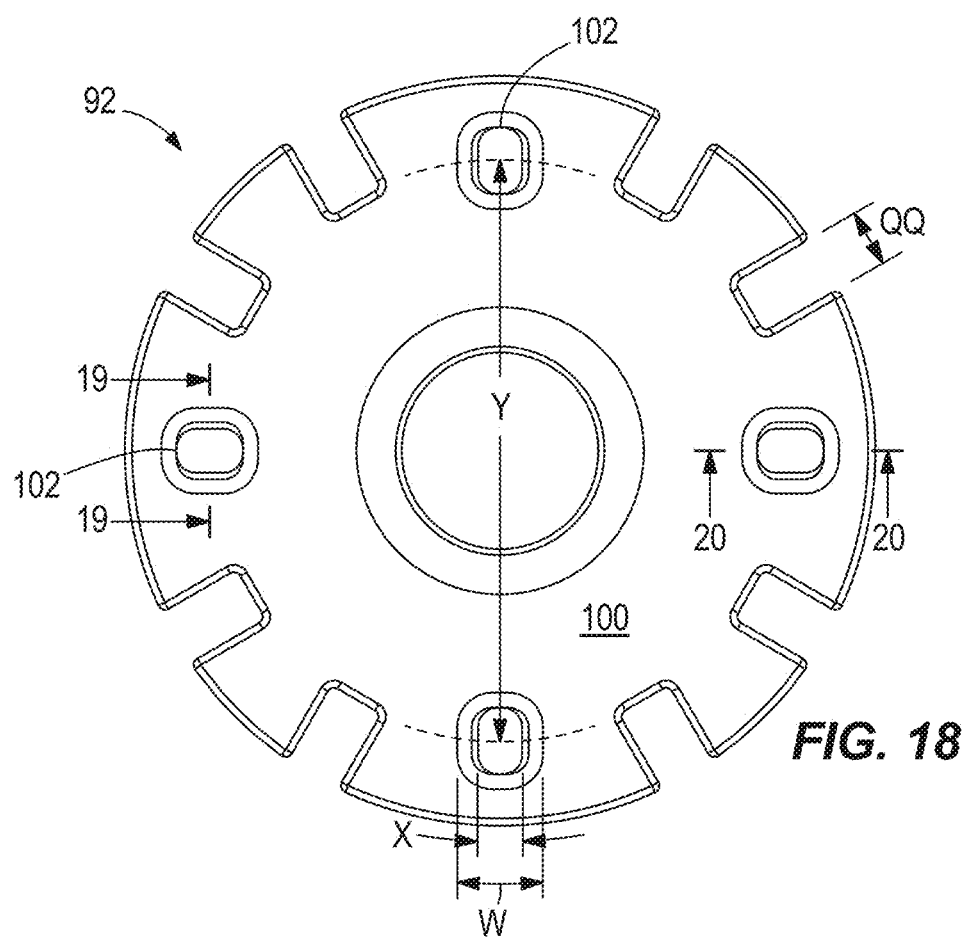
FIG. 18 is a bottom view of the adapter of FIG. 17.

As shown in FIGS. 17-23, the power tool 10 also includes a two-sided adapter 92 for mating with the tool holder 42 to provide different locating features for receiving output elements 18 having different apertures. The adapter 92 includes a first side (FIGS. 17-20) having a first surface 100 and a second side (FIGS. 21-22) having a second surface 108. The adapter 92 includes eight apertures 94. In the illustrated construction, the apertures 94 are slots extending radially inward from an outer edge 96 for receiving the locating features 84 of the tool holder 42 and for providing a substantially zero-clearance fit with the locating features 84 of the tool holder 42. In other constructions, the apertures may be configured as recesses, cavities, holes, openings, etc. The apertures 94 correspond with the size and spacing of the locating features 84 of the tool holder 42 and each includes a pair of substantially parallel side walls 93 defining the aperture 94. The pair of side walls 93 are spaced apart from each other by a width QQ of about 1.9 mm (0.075 in.) (FIGS. 14 and 18).

Each of the apertures 94 also includes a radius R3. The radius R3 is located between each side wall 93 and the respective adjacent surface (i.e., the first surface 100 or the second surface 108) on both sides of the adapter 92. In the illustrated construction, the radius R3 is about 0.24 mm (0.0094 in.) and in other constructions may be between about 0.20 mm (0.0079 in.) and about 0.30 mm (0.012 in.) The radii R3 are sized and spaced from each other across the aperture 94 specifically to fit the locating features 84. In other constructions in which the locating features 84 on the tool holder 42 have other sizes and shapes, the size of the radius R3 and the width QQ between radii R3 may be adapted to fit the locating features 84. The adapter 92 also includes a central aperture 98 for receiving the clamp shaft 44.

Figure 25:
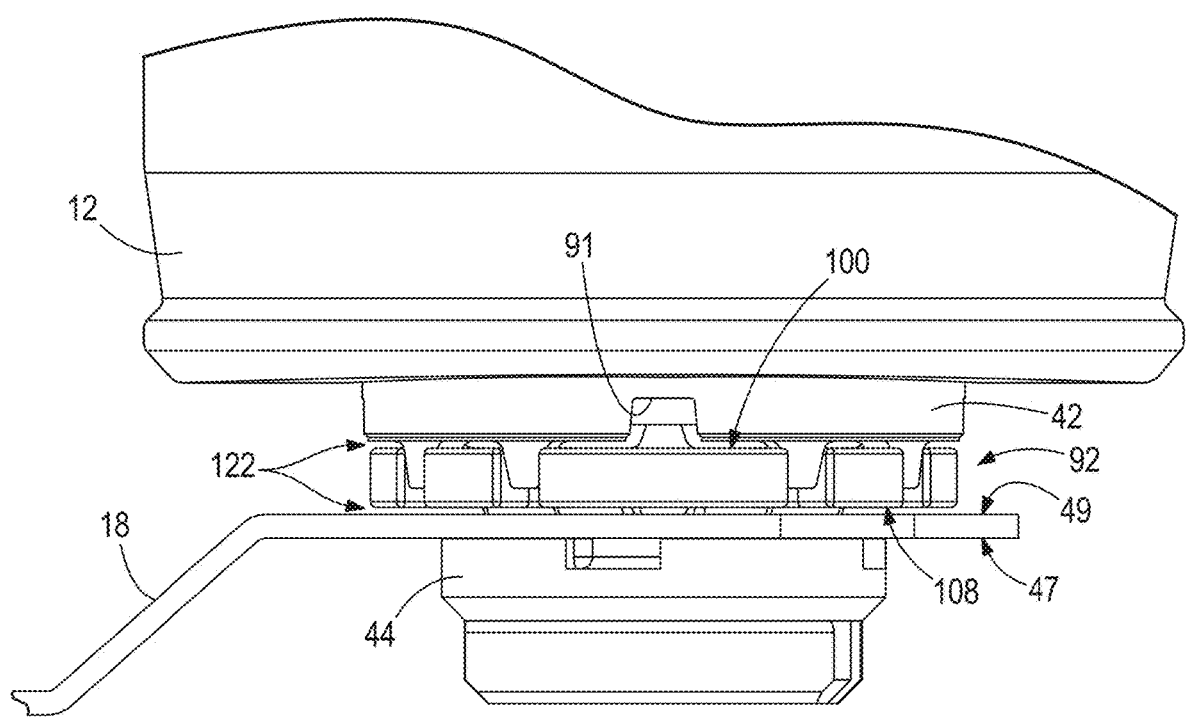
FIG. 25 is a side view of a portion of the power tool of FIG. 1 showing the adapter of FIG. 17 installed with an opposite surface facing the tool holder.

The tool holder 42 is fully engaged with the adapter 92 when the locating features 84 are fully received in the apertures 94, i.e., when the adapter 92 is wedged onto the locating features 84 such that the locating features 84 are received by the apertures 94 and the adapter 92 is inhibited from moving closer to the outer surface 86 by the increased base width G of the locating feature 84 with respect to the corresponding width QQ of the aperture 94 of the adapter 92. When the adapter 92 is fully received, the adapter 92 substantially does not engage the bases 51 of the locating features 84. In the illustrated construction, the adapter 92 may be fully received by the locating features 84 when the adapter is flipped with either the first surface 100 facing the tool holder 42 (FIG. 24) or the second surface 108 facing the tool holder 42 (FIG. 25). Thus, the adapter 92 has the substantially zero-clearance fit with the tool holder 42 and is fully engaged with the tool holder 42 (as described above), with the gap 122 present between the first surface 100 (or the second surface 108) and the outer surface 86 of the tool holder 42 in a similar manner as described above with respect to the output element 18 being installed on the tool holder 42 or on the adapter 92.

FIG. 18 illustrates the first side of the adapter having the first surface 100. The first side includes four raised locating features 102 spaced evenly about a center of the adapter (i.e., about 90 degrees apart). Each locating feature 102 has a base width W of about 2.27 mm (0.0894 in.) and a top width X of about 1.26 mm (0.0496 in.) The locating features 102 are diametrically opposed from each other by a distance Y of about 19.34 mm (0.7614 in.) Each locating feature 102 is tapered to provide substantially a zero-clearance fit with and fully engage (leaving the gap 122 as described above) the output element 18 in a similar manner as described above with respect to the locating features 84. Thus, the adapter 92 is essentially an extension of the tool holder 42 that provides a different size, shape, or arrangement of locating features 102 and may be defined as being a part of the tool holder 42 when attached to the tool holder 42. The taper provides substantially a zero-clearance fit in full engagement (as described above) with the output element 18 so as to transfer oscillating motion to the output element 18 without substantial gaps or wobbling therebetween, while leaving the gap 122 as described above.

In the illustrated construction, when the adapter is flipped such that the first surface 100 faces the tool holder 42, the locating features 102 do not substantially engage the tapered groove 90 of the tool holder 42, but may be partially received in the tapered groove 90 without contacting the recessed base 91 of the groove 90. However, in other constructions, the locating features 102 of the adapter 92 are fully received in and engage with the tapered groove 90 such that the adapter 92 is inhibited from moving closer to the tool holder 42 because the tapered groove 90 narrows towards the recessed base 91 having the base width T. In such constructions, the locating features 102 are engaged in the tapered groove 90 in the tool holder 42 without contacting the recessed base 91 of the groove 90. Thus, the locating features 102 have the substantially zero-clearance fit with the tool holder 42 and are fully engaged with the tool holder 42 (as described above), with the gap 122 present between the first surface 100 and the outer surface 86 of the tool holder 42 in a similar manner as described above with respect to the output element 18 being installed on the tool holder 42 or on the adapter 92. As such, in the illustrated construction, the substantially zero-clearance fit is achieved by the engagement between the locating features 84 of the tool holder 42 and the apertures 94 in the adapter 92. However, in some constructions, the substantially zero-clearance fit is alternatively or additionally achieved by an engagement between the locating features 102 of the adapter 92 and the tapered groove 90 in the tool holder, as described above.

FIG. 19 illustrates a cross section through one of the locating features 102 showing the taper in the circumferential direction. The locating feature 102 has a circumferential taper angle Z of about 36 degrees included between circumferential sidewalls 104 such that a circumferential sidewall 104 has an angle AA with respect to the first surface 100 of about 108 degrees. In some constructions, the locating feature 102 is sunken with respect to the first surface 100 by a distance of about 0.25 mm (0.0098 in.) (similar to the locating feature 84 being sunken with respect to the outer surface 86 by the distance M as shown in FIG. 14). In the illustrated construction, the locating feature 102 need not be sunken and is flush with the first surface 100.

Figure 20:
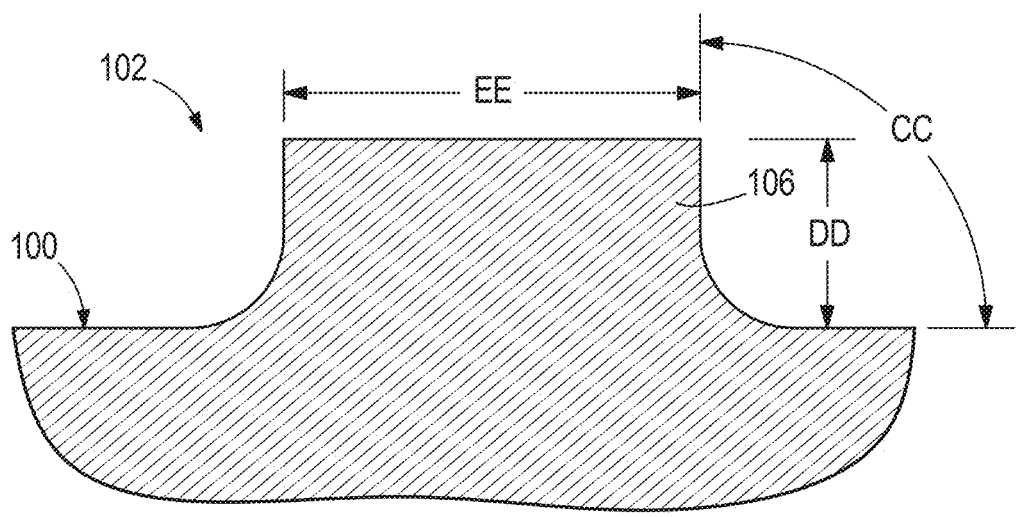
FIG. 20 is a cross section view of a portion of the adapter taken along line 20-20 in FIG. 18.

FIG. 20 illustrates a cross section through one of the locating features 102 showing the taper in a radial direction. In the illustrated construction, the locating feature 102 is substantially not tapered in the radial direction such that a radial sidewall 106 has an angle CC with respect to the first surface 100 of about 90 degrees. Essentially, the locating feature 102 is not tapered in the radial direction; however, in other constructions, the locating feature 102 may be tapered in the radial direction (e.g., such that the angle CC is greater than 90 degrees) as well as the circumferential direction. FIG. 16 also illustrates a height DD of the locating feature, which is about 1.5 mm (0.059 in.) with respect to the first surface 100. The locating feature 102 has a length EE of about 2.35 mm (0.0925 in.)

Figure 21:
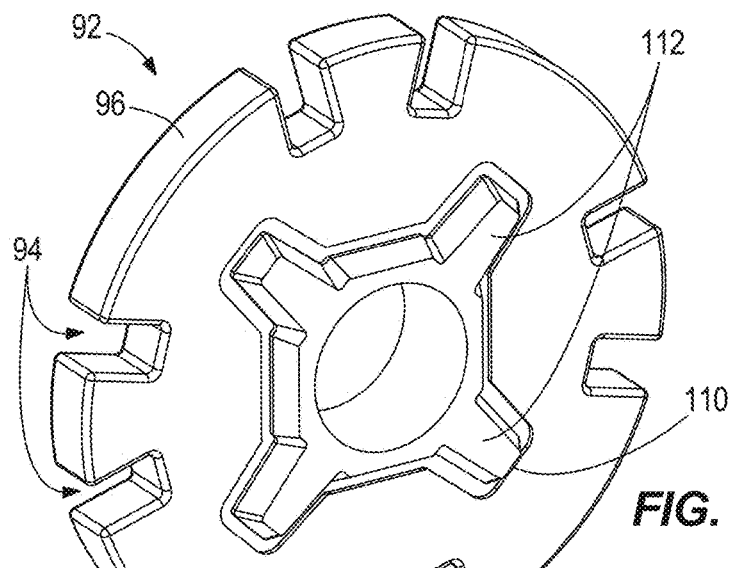
FIG. 21 is a top perspective view of the adapter of FIG. 17.
Figure 22:
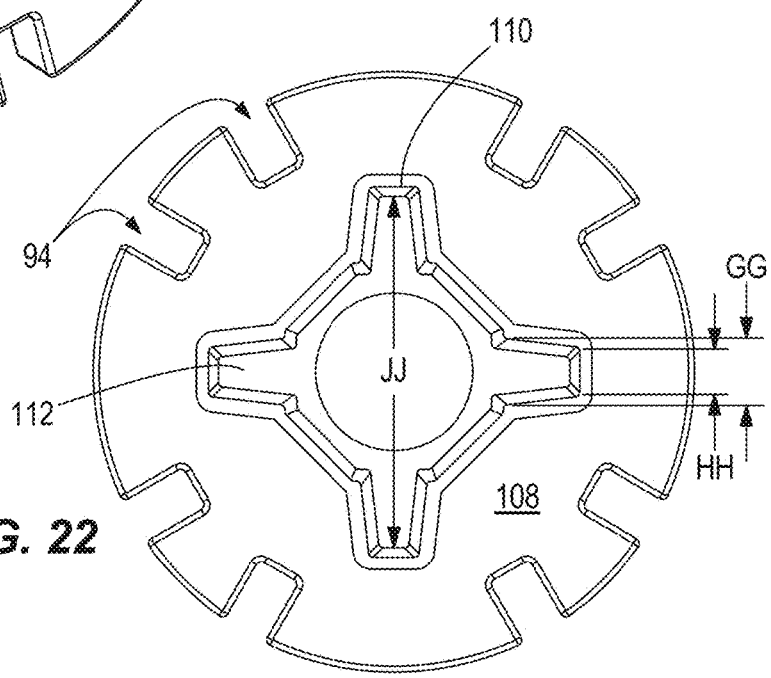
FIG. 22 is a top view of the adapter of FIG. 17.
Figure 23:
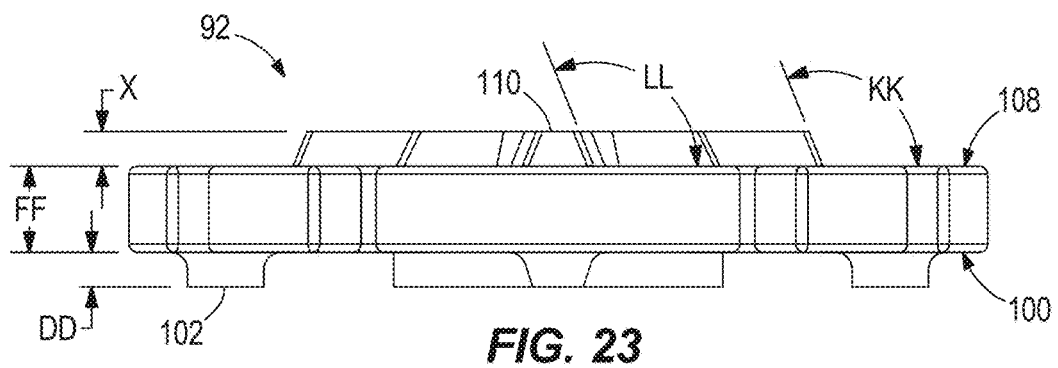
FIG. 23 is a front view of the adapter of FIG. 17.
Figure 24:
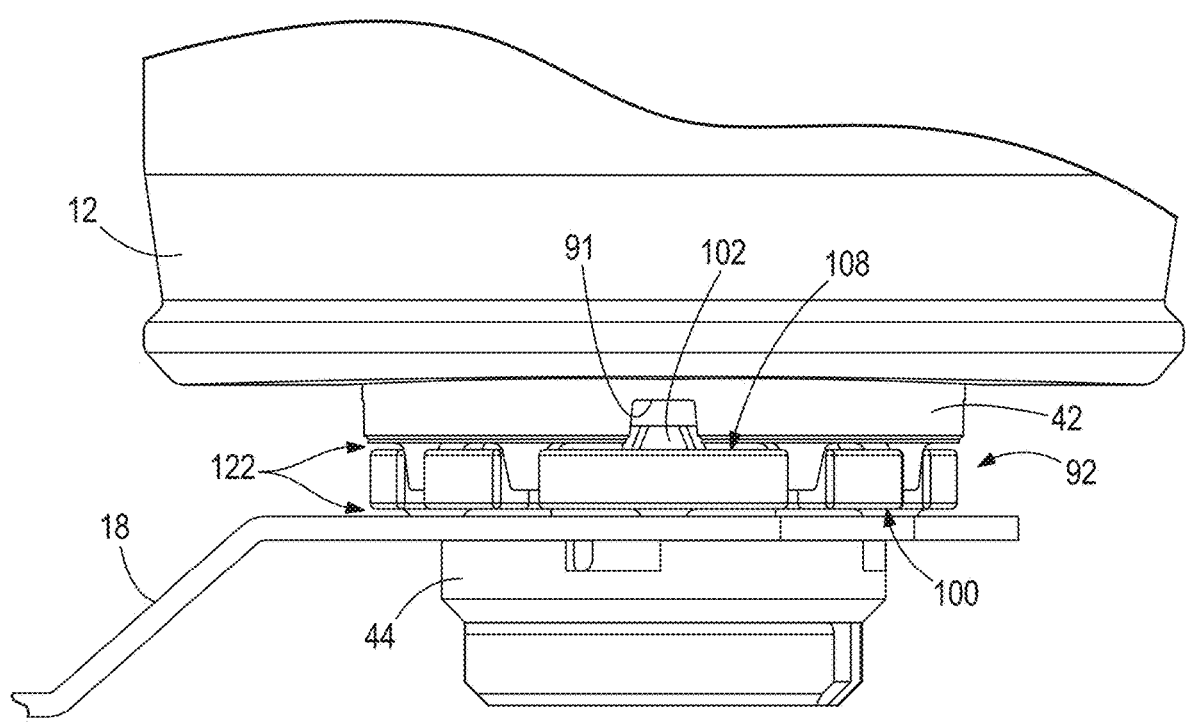
FIG. 24 is a side view of a portion of the power tool of FIG. 1 showing the adapter of FIG. 17 installed with one surface facing the tool holder.

FIGS. 21-22 illustrate the second side of the adapter 92. The second side has the second surface 108 substantially parallel to the first surface 100 and spaced therefrom by a distance FF of about 2.5 mm (0.098 in.) (FIG. 23). The second side includes a locating feature 110 having four radially extending arms 112 evenly spaced with respect to each other (i.e., about 90 degrees apart). Each arm 112 has a base width GG of about 2.97 mm (0.117 in.) and a distal width HH of about 1.34 mm (0.0528 in.) The distal ends of the arms 112 are diametrically opposed from each other by a distance JJ of about 14.44 mm (0.569 in.) Each arm 112 is tapered in at least the circumferential direction (FIG. 23) located at the corners of a distal end of the arm 94. The taper provides substantially a zero-clearance fit in full engagement (as described above) with the output element 18 so as to transfer oscillating motion to the output element 18 without substantial gaps or wobbling therebetween, while leaving the gap 122, as described above, in a similar manner as described above with respect to the locating features 84. Thus, the adapter 92 is essentially an extension of the tool holder 42 that provides a different size, shape, or arrangement of locating feature 110 and may be defined as being a part of the tool holder 42 when attached to the tool holder 42.

In the illustrated construction, when the adapter 92 is flipped such that the second surface 108 faces the tool holder 42, the locating feature 110 does not substantially engage the tapered groove 90 of the tool holder 42, but may be partially received in the tapered groove 90 without contacting the recessed base 91 of the groove 90. However, in other constructions, the locating feature 110 of the adapter 92 is fully received and engaged in the tapered groove 90 such that the adapter 92 is inhibited from moving closer to the tool holder 42 because the tapered groove 90 narrows towards the recessed base 91 having the base width T. In such constructions, the locating feature 110 is received in the tapered groove 90 in the tool holder 42 without contacting the recessed base 91 of the groove 90. Thus, the locating feature 110 has the substantially zero-clearance fit with the tool holder 42 and is fully engaged with the tool holder 42 (as described above), with the gap 122 present between the second surface 108 and the outer surface 86 of the tool holder 42 in a similar manner as described above with respect to the output element 18 being installed on the tool holder 42 or on the adapter 92. As such, in the illustrated construction, the substantially zero-clearance fit is achieved by the engagement between the locating features 84 of the tool holder 42 and the apertures 94 in the adapter 92. However, in some constructions, the substantially zero-clearance fit is alternatively or additionally achieved by an engagement between the locating feature 110 of the adapter 92 and the tapered groove 90 in the tool holder, as described above.

FIG. 23 illustrates the taper angle KK of the distal end 95 of the arm 112 is about 112 degrees with respect to the second surface 108 and the taper angle LL of the sides of the arm 112 is about 106 degrees with respect to the second surface 108. A height X of the locating feature 110 is about 1.5 mm (0.059 in.) and the locating feature 110 includes a non-tapered portion having a height MM of about 0.5 mm (0.020 in.)

The power tool 10 also includes a light emitting diode (LED) 114 (FIG. 3) disposed in a front of the housing 12 adjacent the rear bearing 64 in the direction of longitudinal axis A. The LED 114 is angled downward toward the output member 18 so as to provide useful lighting in the vicinity of the workpiece. A lens 116 covers the LED 114 to diffuse the light.

Figure 26:
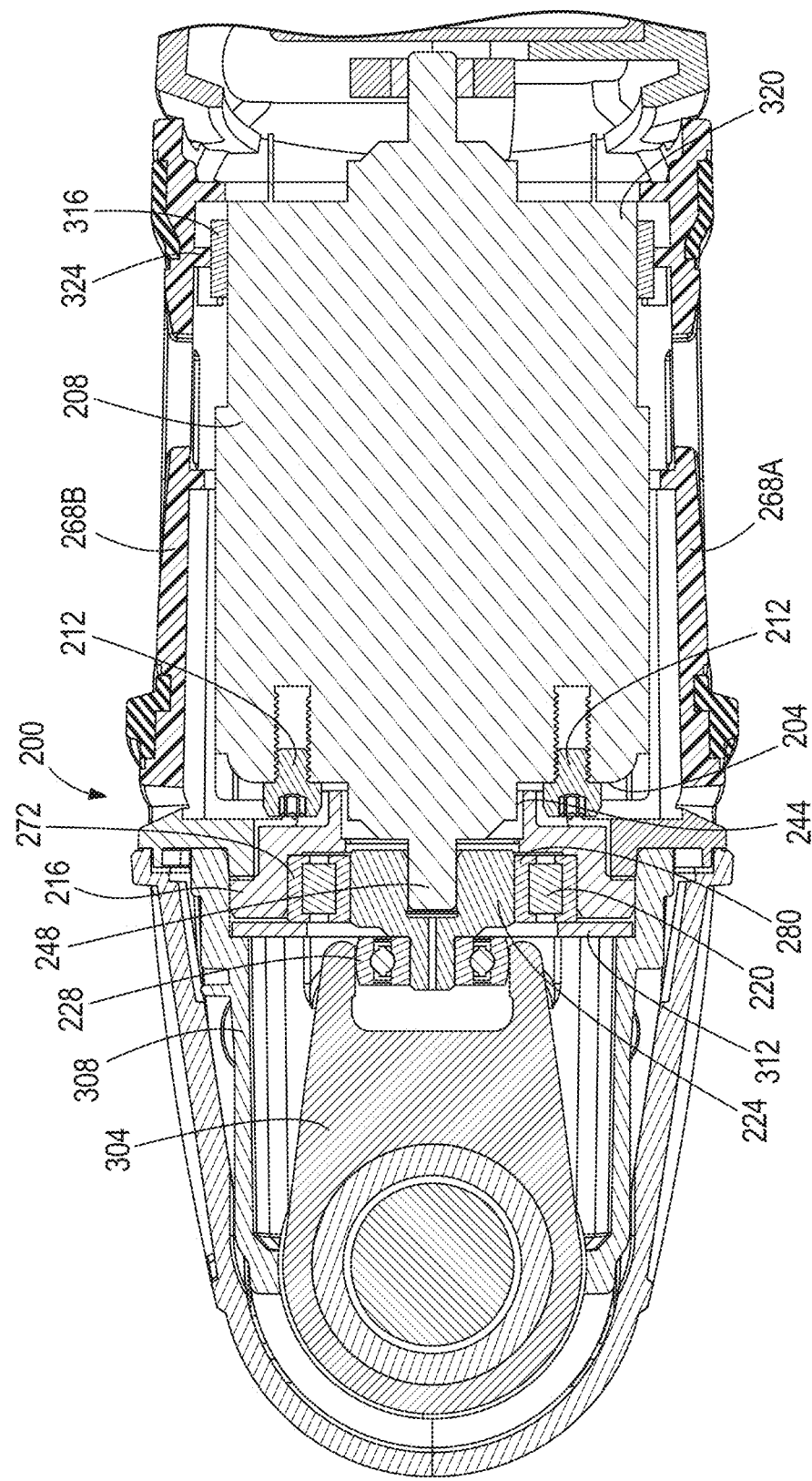
FIG. 26 is a cross-sectional view of a portion of the power tool of FIG. 1.

FIG. 26 illustrates a motor mount assembly 200 for the motor 14 of the power tool 10. The motor mount assembly 200 connects to an axial face 204 of a motor can 208 to mount the motor 14 within the housing 12. The assembly 200 secures the motor 14 axially, radially, and laterally to inhibit the motor 14 from sliding, rotating/spinning, or wobbling/pitching relative to the housing 12 during operation of the power tool 10.

Figure 27:
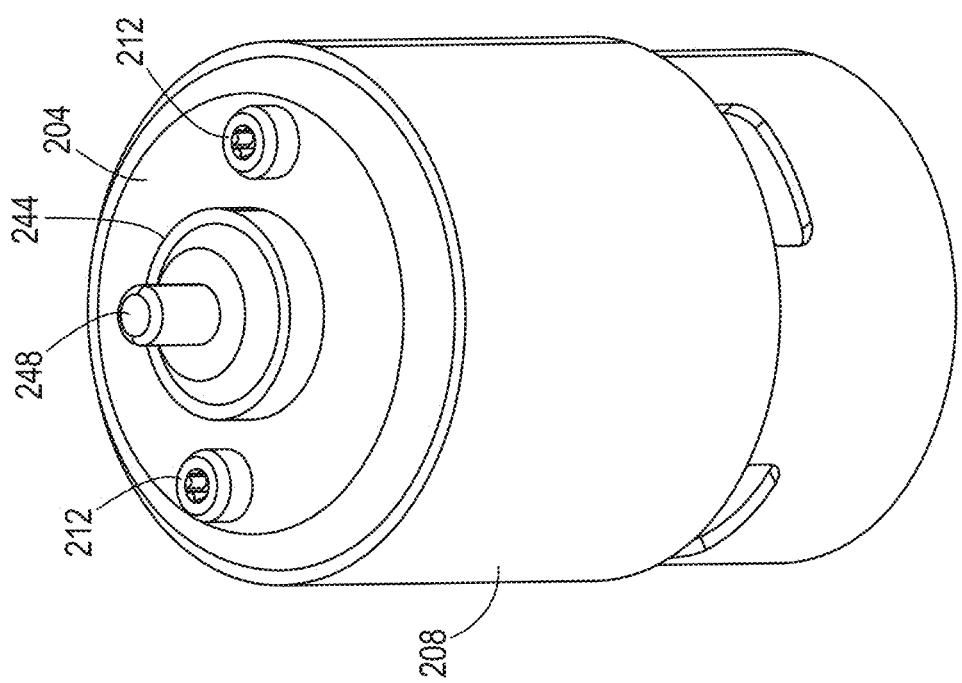
FIG. 27 is a perspective view of a motor of the power tool of FIG. 1.

The illustrated motor mount assembly 200 includes shoulder pins 212, a motor plate 216, a motor plate bearing 220, an eccentric shaft 224, and an eccentric bearing 228. As shown in FIGS. 26 and 27, the shoulder pins 212 are coupled to and extend from the axial face 204 of the motor can 208. The illustrated shoulder pins 212 are threaded into the motor can 208, but may alternatively be connected to the motor can 208 using other suitable coupling means. In the illustrated embodiment, the motor mount assembly 200 includes two shoulder pins 212 circumferentially spaced 180 degrees apart. In other embodiments, the motor mount assembly 200 may include fewer or more shoulder pins that extend from the motor can 208.

Figure 28:
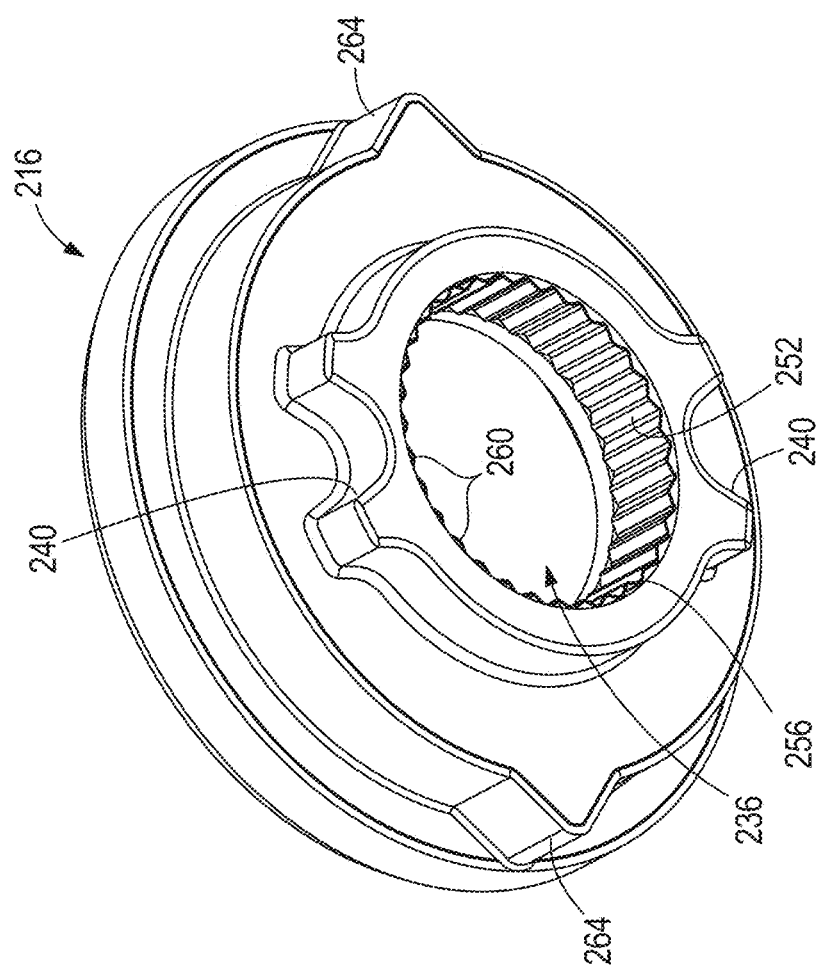
FIG. 28 is a perspective view of a motor plate of a motor mount assembly for use with the motor of FIG. 27.
Figure 29:
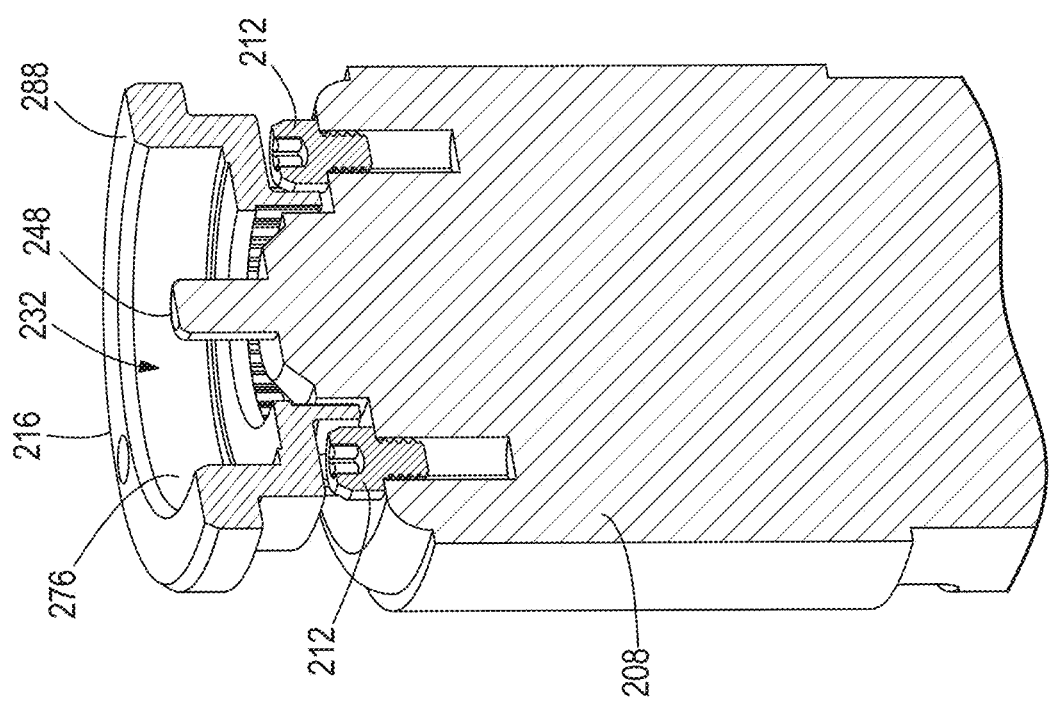
FIG. 29 is a perspective cross section view of the motor plate connected to the motor.

As shown in FIG. 28, the motor plate 216 is an annular member that includes a relatively large central opening 232 (FIG. 29), a relatively small central opening 236, and two recesses 240 positioned on diametrically opposite sides of the small central opening 236. The relatively large central opening 232 is shaped and sized to receive the motor plate bearing 220. The relatively small central opening 236 fits around a boss 244 of the motor can 208 and provides clearance for a shaft 248 of the motor 14. The recesses 240 receive the shoulder pins 212 to radially align the motor plate 216 on the motor can 208, as shown in FIG. 29. The recesses 240 and the shoulder pins 212 also inhibit relative rotation between the motor can 208 and the motor plate 216. In some embodiments, the motor plate 216 may include fewer or more recesses, depending on the number of shoulder pins extending from the motor can 208.

Referring back to FIG. 28, the motor plate 216 also includes a tolerance ring 252 coupled to an inner surface 256 of the motor plate 216 that defines the relatively small central opening 236. In some embodiments, the tolerance ring 252 has a larger diameter than the small central opening 236 such that the ring 252 is secured to the inner surface 256 of the motor plate 216 by its own resiliency. In other embodiments, the tolerance ring 252 may be secured to the inner surface 256 of the motor plate 216 using adhesives, fasteners, or other suitable coupling means. The tolerance ring 252 includes a series of deformation or waves 260. The waves 260 engage the boss 244 of the motor can 208 and may be deformed when the motor plate 216 is pressed onto the motor can 208 to take up manufacturing tolerances between the motor plate 216 and the motor can 208. When the motor plate 216 is fully installed on the motor can 208, the motor plate 216 is spaced slightly apart (e.g., no closer than 0.5 mm (0.020 in.)) from the axial face 204 of the motor can 208.

The motor plate 216 further includes two projections 264 formed on diametrically opposite sides of the small central opening 236. The illustrated projections 264 are circumferentially spaced 180 degrees apart and are evenly spaced between the recesses 240. The projections 264 are captured between two clamshell portions 268A, 268B (FIG. 26) of the housing 12 when the housing 12 is assembled to inhibit rotation of the motor plate 216, and thereby the motor 14 relative to the housing 12. In other embodiments, the motor plate 216 may include fewer or more projections that are engaged by the housing 12 to inhibit rotation of the motor plate 216 relative to the housing 12.

Figure 30:
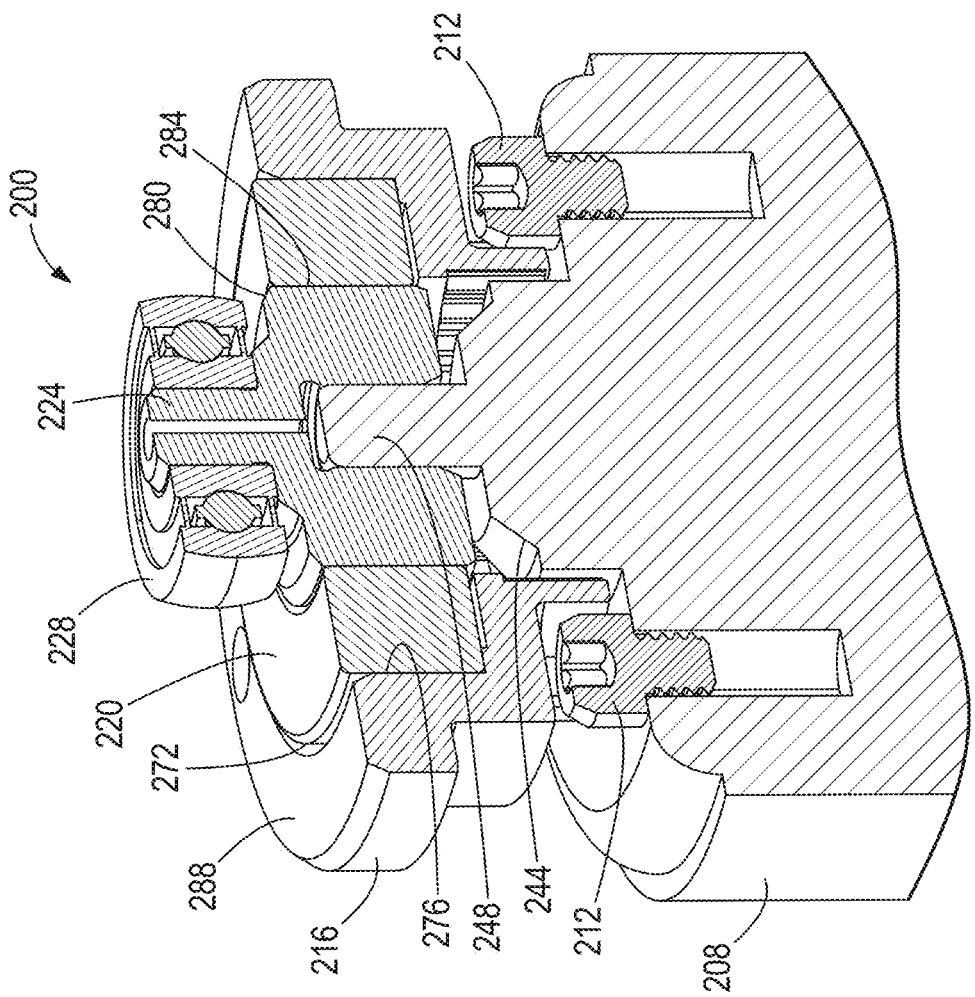
FIG. 30 is a perspective cross section view of the motor mount assembly connected to the motor.

As shown in FIG. 30, the motor plate bearing 220 is positioned within the relatively large central opening 232 of the motor plate 216 and surrounds the motor shaft 248. The motor plate bearing 220 includes an outer race 272 that engages an inner surface 276 of the motor plate 216 and an inner race 280 that engages an outer surface 284 of the eccentric shaft 224. The motor plate 216 helps concentrically align the motor plate bearing 220 with two motor shaft bearings positioned inside the motor can 208. When assembled within the central opening 232, the motor plate bearing 220 protrudes axially beyond an outer face 288 of the motor plate 216.

Figure 31:
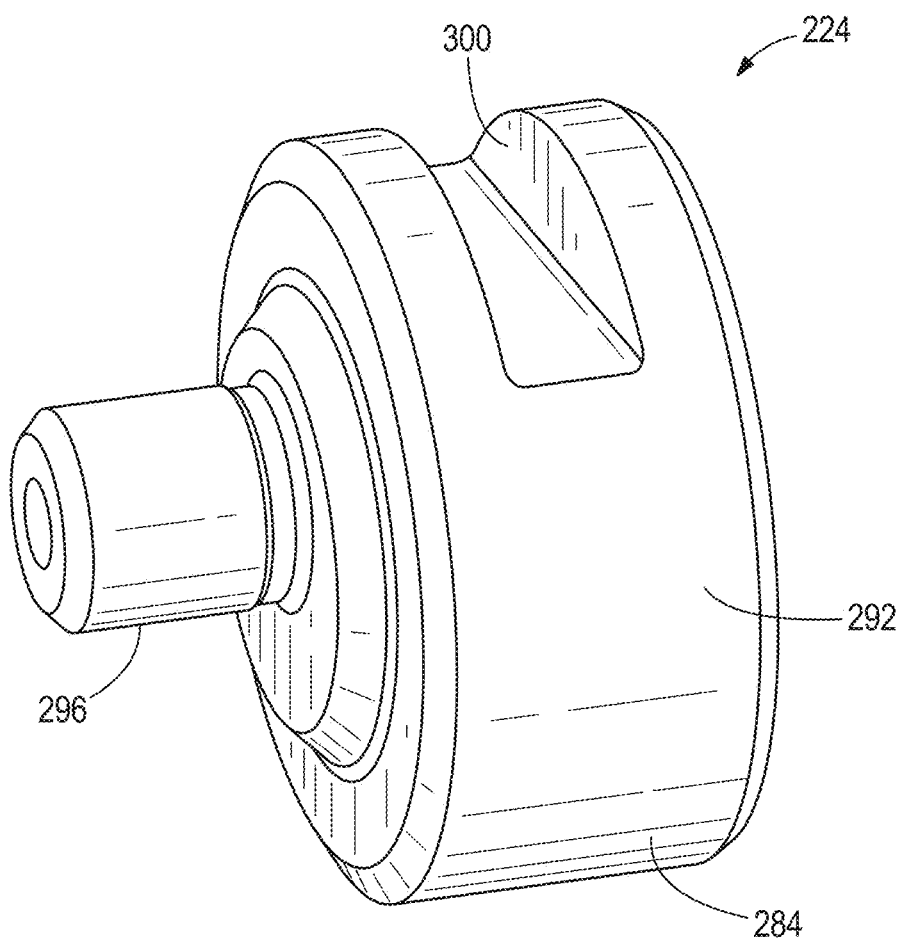
FIG. 31 is a perspective view of an eccentric shaft of the motor mount assembly.
Figure 32:
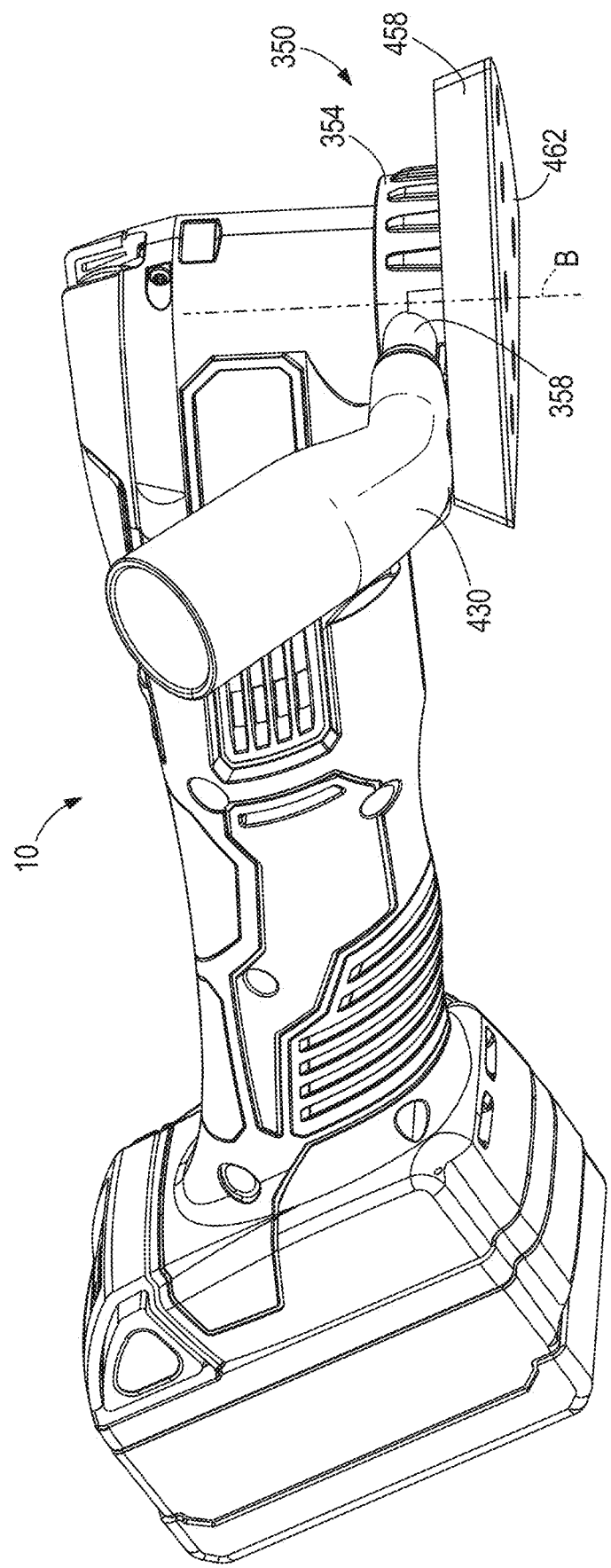
FIG. 32 is a perspective view an accessory for use with the power tool of FIG. 1.
Figure 33:
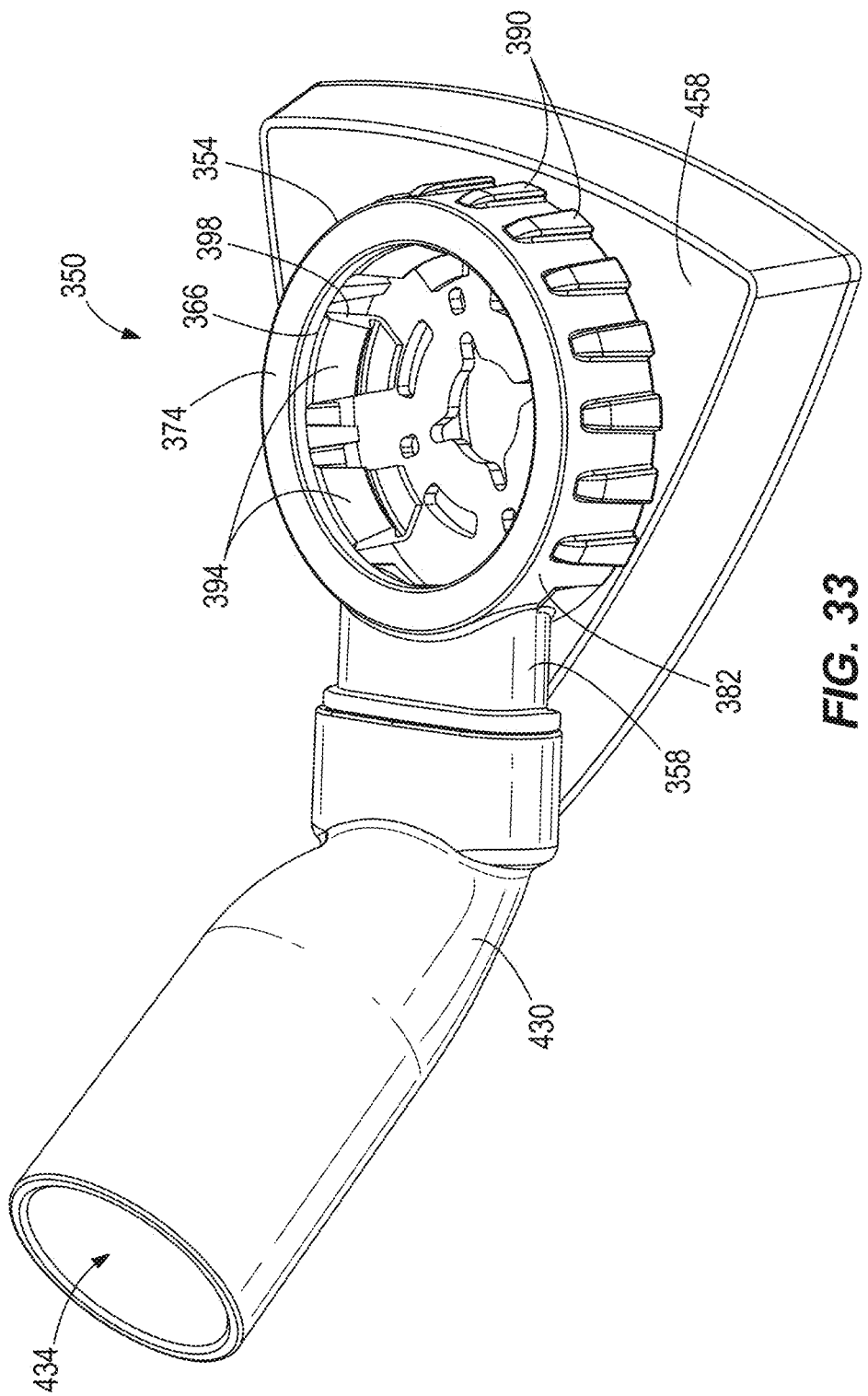
FIG. 33 is a top perspective view of the accessory FIG. 32.
Figure 34:
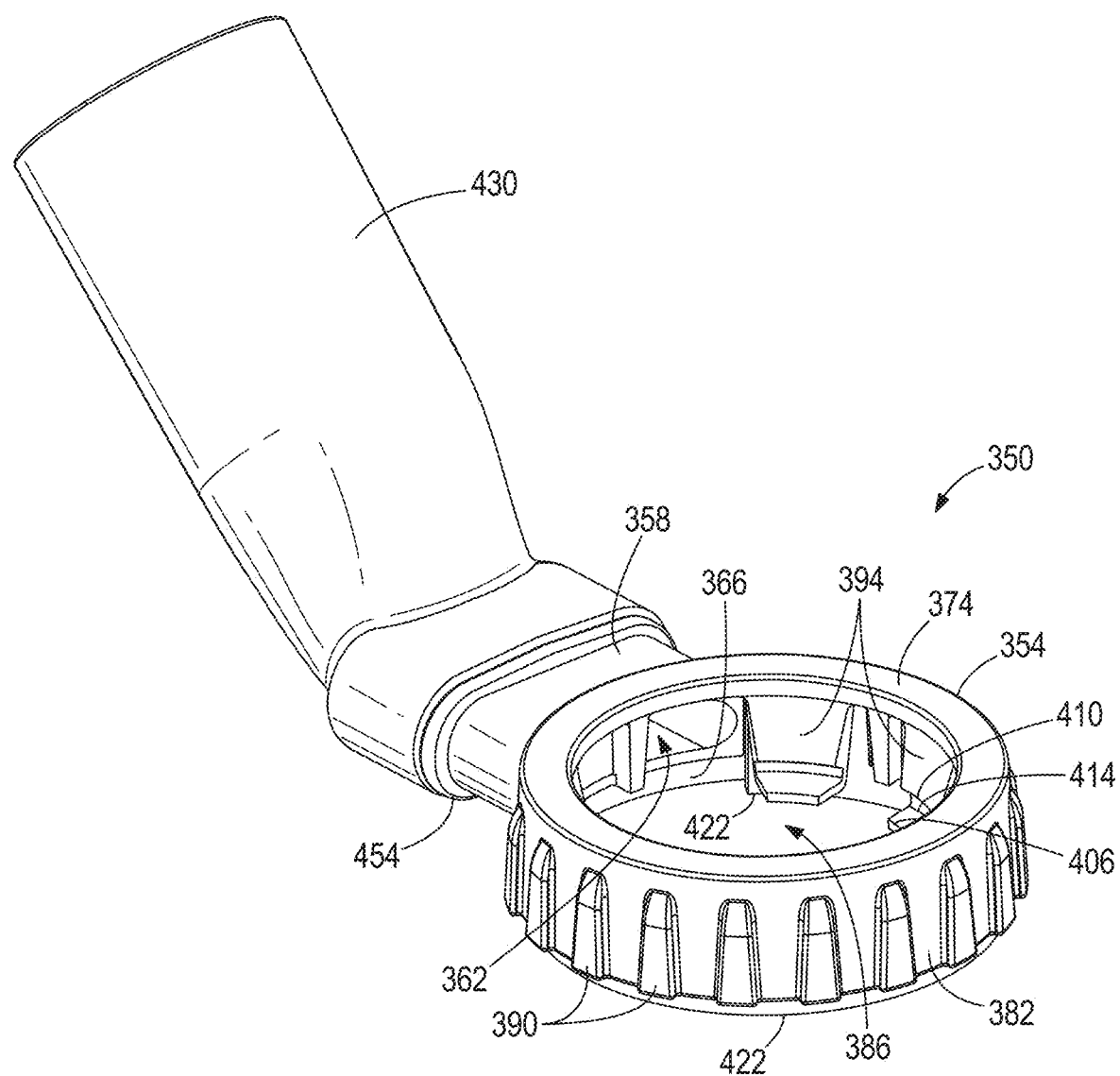
FIG. 34 is a top perspective view of the accessory FIG. 32.
Figure 36:
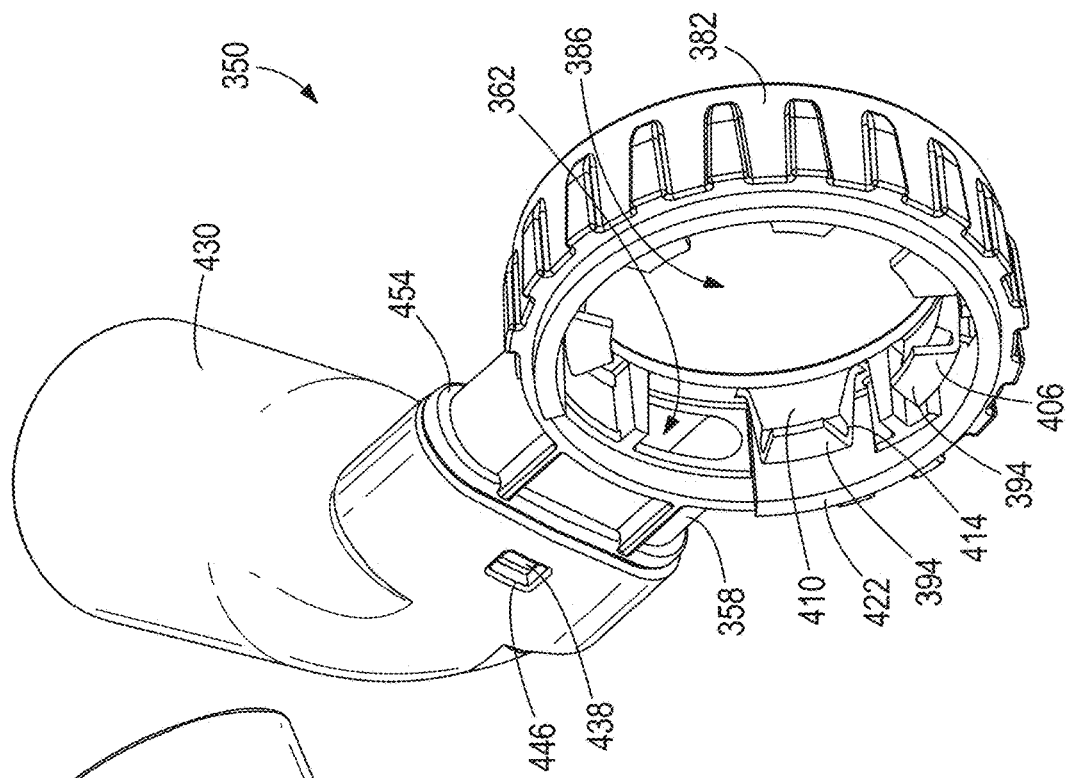
FIG. 36 is a bottom perspective view of the accessory of FIG. 32 including a seal member.
Figure 35:
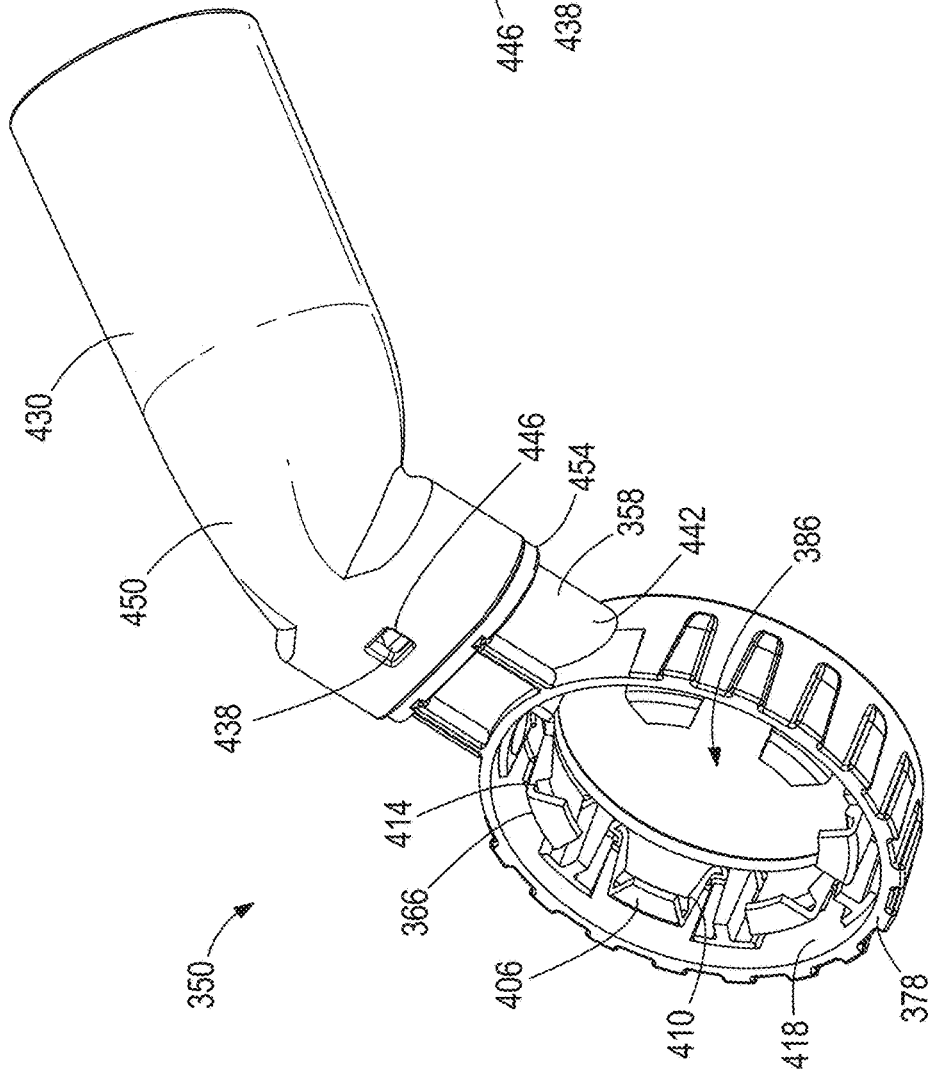
FIG. 35 is a bottom perspective view of the accessory of FIG. 32.
Figure 37:
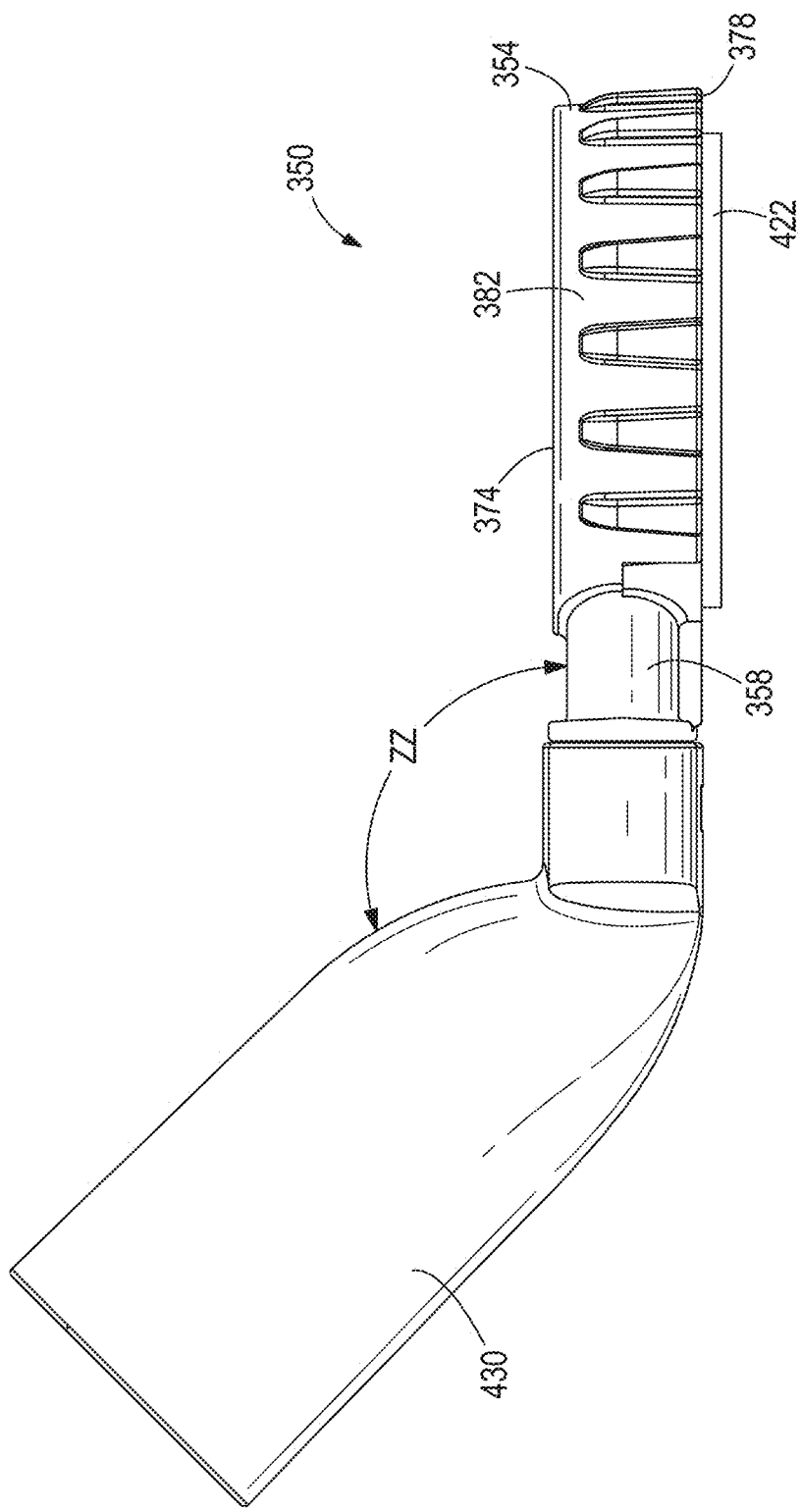
FIG. 37 is a side view of the accessory of FIG. 32.
Figure 38:
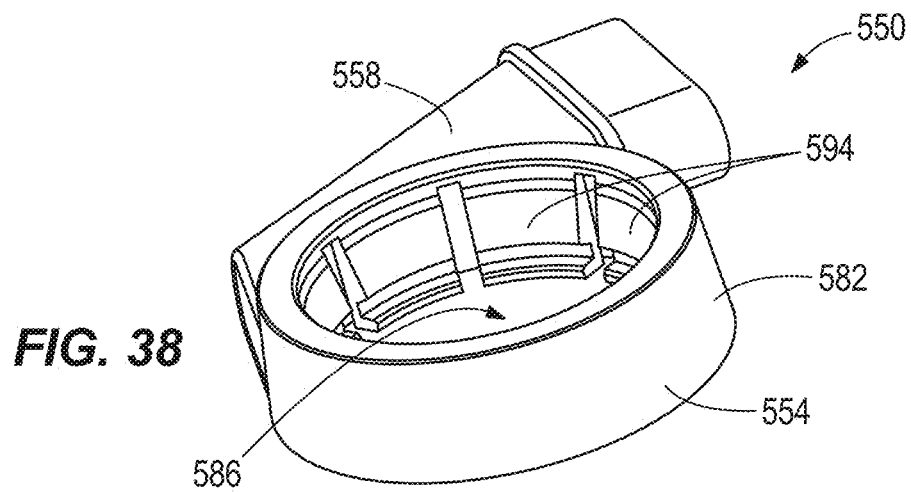
FIG. 38-41 are perspective views of another accessory for use with the power tool of FIG. 1.
Figure 39:
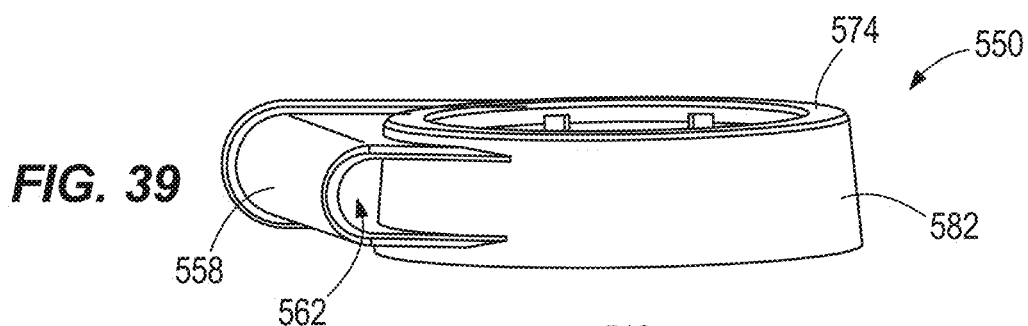
Figure 40:
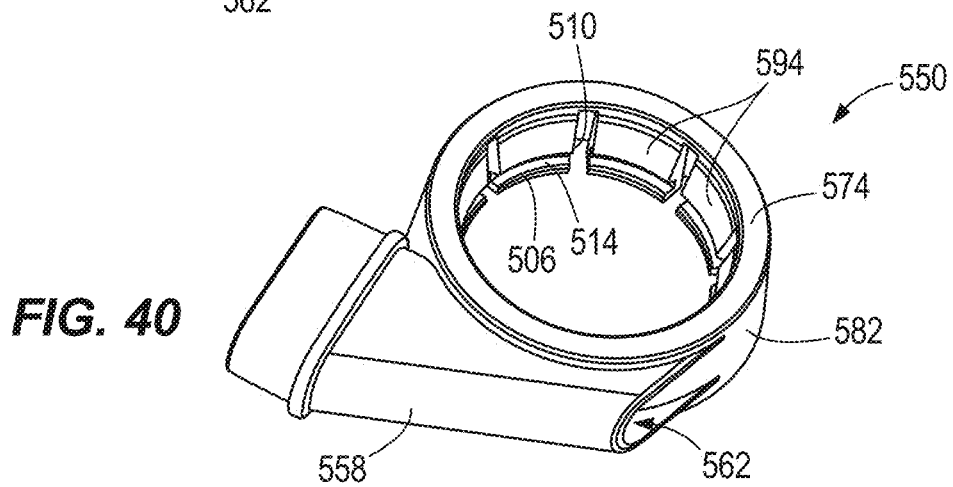
Figure 41:
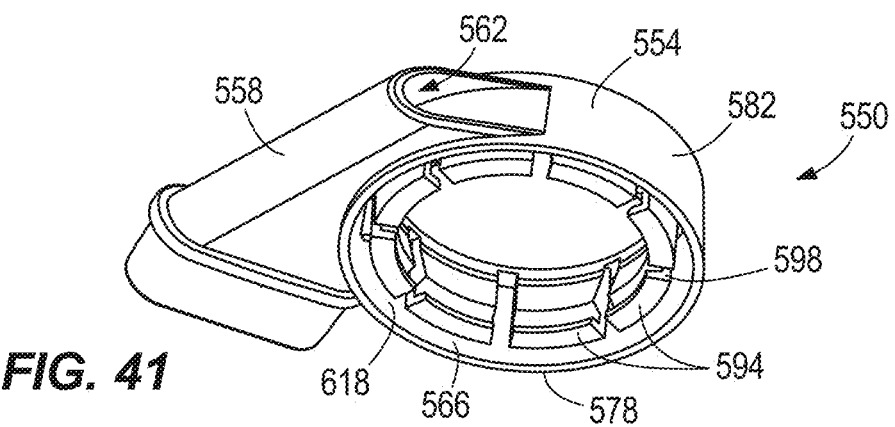

The eccentric shaft 224 is secured to the motor shaft 248 for rotation with the motor shaft 248. As shown in FIG. 31, the eccentric shaft 224 includes a body portion 292 and an eccentric portion 296. The body portion 292 receives the motor shaft 248. The eccentric portion 296 extends axially from the body portion 292 and supports the eccentric bearing 228. An aperture 300 is formed in the outer surface 284 of the body portion 292 to help balance the eccentric shaft 224 during rotation. The illustrated aperture 300 is a single, continuous slot formed in the body portion 292 by removing material from the body portion 292. In other embodiments, the aperture 300 may be a series of discrete slots or holes formed in the body portion 292. The aperture 300 balances the eccentric shaft 224 such that a separate counterweight does not need to be coupled to the motor shaft 248 or the eccentric shaft 224. Furthermore, when the motor plate bearing 220 is positioned around the body portion 292 of the eccentric shaft 224, the inner race 280 of the bearing 220 substantially covers the aperture 300 to inhibit grease and other debris from filling the aperture 300.

Referring back to FIG. 30, the eccentric bearing 228 is secured to the eccentric portion 296 of the eccentric shaft 224. In the illustrated embodiment, the eccentric bearing 228 is a spherical bearing. In other embodiments, other suitable bearings may also or alternatively be employed. The eccentric bearing 228 engages a fork 304 (FIG. 26) of the drive mechanism 16 to convert rotary motion of the motor 14 into oscillating motion.

In the illustrated embodiment, the motor plate bearing 220, the eccentric shaft 224, and the eccentric bearing 228 are preassembled as a single unit before being installed on the motor shaft 248. In particular, the motor plate bearing 220, the eccentric shaft 224, and the eccentric bearing 228 are press-fit together prior to being inserted into the motor plate 216 and connected to the motor shaft 248. Such an arrangement facilitates assembling the motor mount assembly 200 on the motor 14 without having to independently install each of the components.

As shown in FIG. 26, once assembled on the motor can 208, the motor mount assembly 200 is connected to a gear case 308 of the drive mechanism 16 to mount the motor 14 within the housing 12 and connect the motor 14 to the drive mechanism 16. The motor plate bearing 220 engages a washer 312 within the gear case 308 to axially align the motor 14 with the gear case 308. Since the motor plate bearing 220 protrudes axially beyond the motor plate 216, the motor plate 216 itself does not contact the washer 312. Instead, the motor plate bearing 220 takes up the space between the motor plate 216 and the washer 312. As such, axial and radial loads act on the motor plate bearing 220 rather than on other components of the motor mount assembly 200 or the motor 14.

The motor mount assembly 200 further includes an elastomeric member 316 located at a distal end portion 320 of the motor 14 opposite from the motor plate 216. The illustrated elastomeric member 316 is a rubber band that surrounds the distal end portion 320 of the motor 14. The elastomeric member 316 is engaged by an inwardly-protruding rib 324 of the housing 12 to support the distal end portion 320 of the motor 14. The elastomeric member 316 also helps dampen vibrations of the motor 14.

FIGS. 32-37 illustrate an accessory 350 for the power tool 10 according to one construction of the invention. The accessory 350 includes an attachment portion 354 that is configured to be attached to the housing 12 of the power tool 10 and a tubular portion 358. The tubular portion 358 is coupled to and extends from the attachment portion 354. A first opening or passageway 362 (FIG. 34) extends from an inner surface 366 of the attachment portion 354 through the tubular portion 358.

The attachment portion 354 includes a body 370 having a top surface 374, bottom surface 378 (FIG. 35), and the first, inner surface 366, which is opposite a second, outer surface 382. The body 370 defines an axial opening 386 extending therethrough. The outer surface 382 includes projections 390 that define a gripping surface.

The attachment portion 354 also includes teeth 394 that descend from the top surface 374 and are coupled to the inner surface 366. Adjacent teeth 394 are spaced apart from one another by a recess 398 therebetween. Each tooth includes a body 402 having a bottom surface 406, a flange 410, and a recess 414 deposed between the bottom surface 406 and the flange 410. The body 402 of each tooth is spaced apart from the inner surface 366 such that a gap 418 is created between the inner surface 366 and at least a portion of the body 402 of each tooth 394. Additional or alternative constructions may include more or fewer teeth than illustrated herein having any suitable configuration. The gap 418 is configured to receive a seal member therein, which will be discussed in further detail below. The seal member 422 is removable and constructed from felt; other constructions may include seal members 422 having other compressible, resilient materials. The seal member 422 includes a discontinuity such that the seal member 422 does not obstruct the passageway 362.

The accessory 350 includes an extension member 430 coupled to the tubular portion 358. The extension member 430 defines a second passageway 434. The first and second passageways 362, 434 are aligned when the extension member 430 is secured to the tubular portion 358. The extension member 430 is configured to receive a vacuum hose (not shown). In the illustrated construction, the tubular portion 358 includes a projection 438 extending from an exterior surface 442. The projection 438 is received in an opening or aperture 446 extending through an exterior surface 450 of the extension member 430. Therefore, the extension member 430 may be coupled to the tubular portion 358 by a snap-fit engagement therebetween. The tubular portion 358 includes a circumferential rib 454 that abuts the extension member 430. In other constructions the extension member 430 and the tubular portion 358 may be integrally molded or formed as one piece. In the illustrated construction, the extension member 430 is oriented at angle ZZ (FIG. 37) relative to the tubular portion 358; other constructions may have an angle ZZ that is greater or less than the angle illustrated herein.

The attachment portion 354 is coupled between a sanding pad 458 and the power tool 10. The sanding pad 458 is secured to the blade clamp mechanism 20 using the same process as described above with respect to FIGS. 1-25. Sand paper 462 may be removably secured to a working surface of the sanding pad 458. In further constructions, the attachment portion 354 may be used with other types of tools, as well.

During assembly, the attachment portion 354 is coupled to the housing 12 of the power tool 10. In particular, the flanges 410 of the teeth 394 are received in a circumferential groove 118 (FIG. 1) in the housing 12 while a circumferential ridge 120 (FIGS. 1-3) portion of the housing 12 is received in the recesses 414 of the teeth 394. As such, the attachment portion 354 is secured to the housing 12 by a snap-fit engagement therebetween. The extension member 430 may be secured to the tubular portion 358 before or after the attachment portion 354 is secured to the power tool 10. The sanding pad 458 is then secured to the clamping mechanism 20 as described above with respect to FIGS. 1-25. A vacuum hose (not shown) is coupled to the extension member 430. The compressive and resilient properties of the seal create a better closure between the attachment portion 354 and the sanding pad 458.

During operation of the accessory 350 the sanding pad 458 oscillates as described above in order to sand a working surface. Dust resulting from the sanding process accumulates between the sanding pad 458 and the power tool 10 within the opening 386 of the accessory 350 and is then sucked through the first and second passageways 362, 434 by the suction function of the vacuum. Because of the snap-fit engagement between the attachment portion 354 and the power tool 10, the attachment portion 354 remains rotatable relative to the power tool 10 even after the sanding pad 458 is secured to the power tool 10. Therefore, the user may rotate the attachment portion 354 about the output axis B of the power tool 10 to position the vacuum hose in different positions about the power tool housing 12 as necessary during the sanding process. The seal member 422 ensures that a tight seal between the attached portion 354 and the sanding pad 458 is maintained, while still allowing the attachment portion 354 to rotate without generating too much heat.

FIGS. 38-41 illustrate an accessory 550 according to another construction of the invention. The accessory of FIGS. 38-41 is similar to the accessory of FIGS. 32-37; therefore, like structure will be identified by like reference numbers plus "200" and only the differences will be discussed hereafter.

The accessory 550 includes an attachment portion 554 that is configured to be attached to the housing 12 of the power tool 10 in the same manner as the accessory 350 described above. The accessory 550 also includes a tubular portion 558. The tubular portion 558 is attached to and extends from the attachment portion 554. A first opening or passageway 562 extends through the tubular portion 558 adjacent an outer surface 582 of the attachment portion 554. The attachment portion 554 is coupled between an output member 18 and the power tool 10. Blades, for example, typically create dust forward of the tool 10. Therefore, during operation of the accessory 550, dust resulting from the oscillation of the output element 18 is sucked through the passageway 562 in the tubular portion 558 by the suction function of the vacuum. Although not necessarily illustrated with respect to FIGS. 38-41 it should be understood that the accessory 550 may include any or all of the additional features discussed above with respect to FIGS. 32-37 (e.g., projection on the outer surface 582 or a seal member between the inner surface 566 and the teeth 594).

Figure 42:
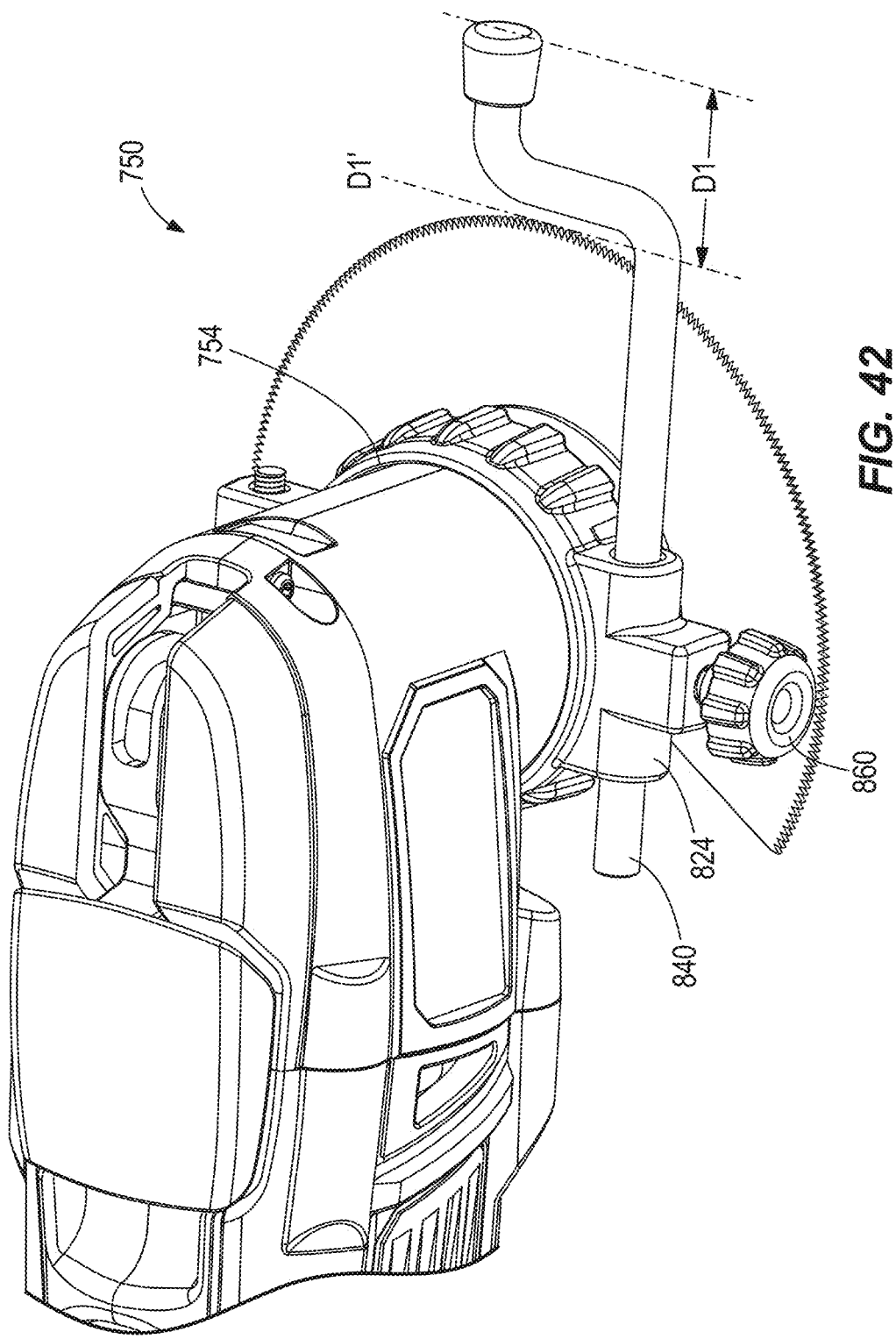
FIG. 42 is a perspective view of yet another accessory for use with the power tool of FIG. 1.
Figure 43:
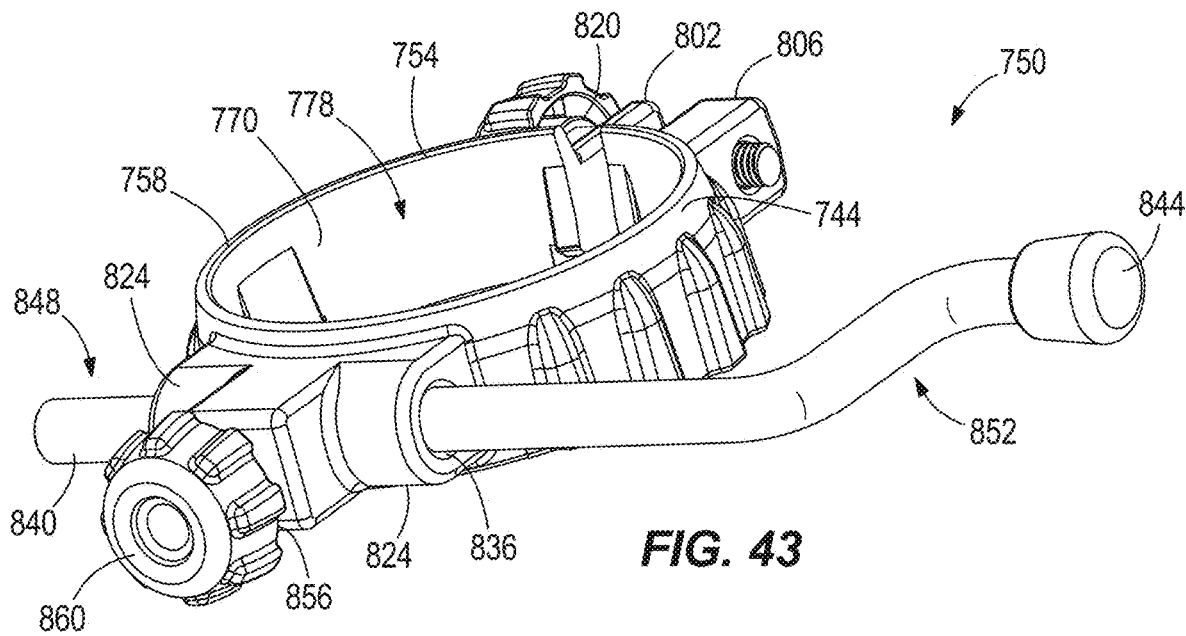
FIG. 43 is a perspective view of the accessory of FIG. 42.
Figure 44:
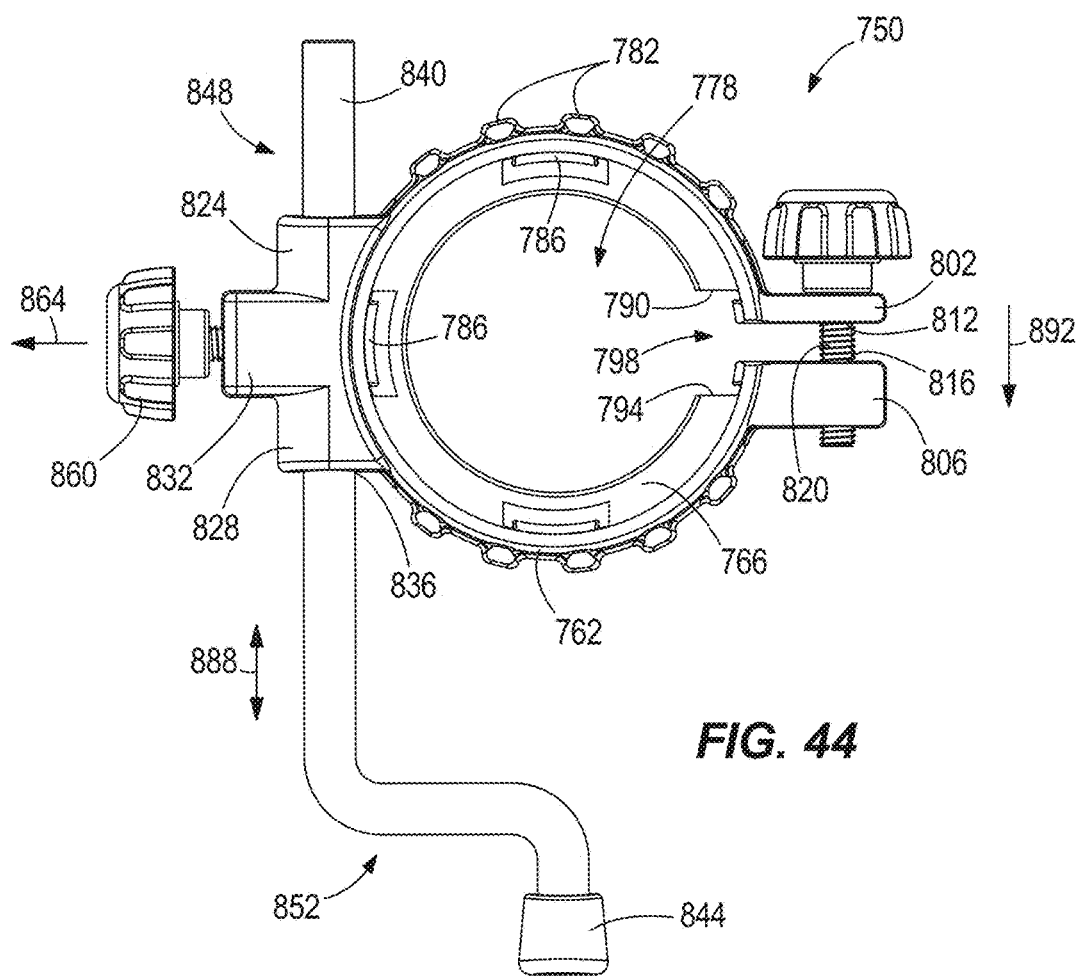
FIG. 44 is a top view of the accessory of FIG. 42.

FIGS. 42-44 illustrate an accessory 750 according to another construction of the invention. The accessory 750 includes an attachment portion 754 that is configured to be attached to the housing 12 of the power tool 10 in the same manner as the accessory 350 described above.

The attachment portion 754 includes a body 758 having a top surface 762, bottom surface 766, and a first, inner surface 770, which is opposite a second, outer surface 774. The body 758 defines an axial opening 778 extending therethrough. The outer surface 774 includes projections 782 that define a gripping surface. The inner surface 770 includes substantially evenly-spaced flanges or teeth 786. The inner surface 770 may include more or fewer teeth than illustrated herein having any suitable configuration.

The body 758 is substantially circular and additionally includes a first end 790 and second end 794 with a gap 798 created therebetween. The first end 790 includes a first projection 802 and the second end 794 includes a second projection 806. The first and second projections 802, 806 extend parallel to one another from the respective ends 794, 798 of the body 758. The first projection 802 includes a through-hole 812 extending therebetween. The second projection 806 includes a closed-hole 816 extending at least partially therethrough. The through-hole 812 and the closed-hole 816 are aligned with one another and adapted to receive a fastener 820 (i.e., a screw) therethrough.

The body 758 further includes extension member 824 extending from the outer surface 774 of the body, opposite the first and second projections 802, 806. The extension member 824 includes a substantially cylindrical portion 828 coupled to a substantially rectangular portion 832. The extension member 824 defines a first through-hole 836 extending through the cylindrical portion 828. The first through-hole 836 is sized and shaped to slideably receive a tubular rod member 840. The rod member 840 includes a stopper 844 at one end. In the illustrated construction, the rod member 840 includes a substantially straight portion 848 coupled to a substantially serpentine or curved portion 852. Although not illustrated, it is contemplated that the straight portion 848 may include measurement indicia on an outer surface thereof. The extension member 824 also includes a second through-hole 856 extending through the rectangular portion 832 and into the cylindrical portion 828. The second through-hole 856 is adapted to receive a fastener 860 (e.g., a set screw). The first and second through-holes 836, 856 of the extension member 824 extend perpendicular to one another.

During assembly, the fastener 860 is removed in the direction of arrow 864, which releases a clamping force on the rod member 840 thereby allowing it slide relative to the through-hole 836 in either direction of arrow 888. As such, the rod member 840 is positioned relative to the attachment portion, and therefore the housing the tool and the blade or work piece. The rod member 840 is configured to extend beyond the blade. Once the rod member 840 is positioned to extend beyond the blade by a desired distance D1, the fastener 860 is advanced in a direction opposite the arrow 864, which restores the clamping force on the rod member 840. The rod member 840 is also able to rotate within the through-hole 836 to position the stopper 844 and the curved portion 852 in other positions relative to the blade.

Subsequently, the attachment portion 754 is coupled to the housing of the power tool. In particular, the teeth 786 are received in the groove in the housing. As such, the attachment portion 754 may be loosely secured and, therefore rotatable relative to, the housing such that the accessory 750 may be positioned or adjusted appropriately relative to the housing. That is, the accessory 750 may be rotated relative to the housing to position the rod member 840 at angles other than the illustrated 180 degrees as appropriate for different work surfaces and tasks. After the attachment portion 754 has been adjusted, the fastener 820 is advanced in the direction of arrow 892 into the closed-hole 816, which draws the first and second projections 802, 806. As the first and second projections 802, 806 are brought closer to one another, the attachment portion 754 tightens about the housing of the power tool thereby securing the accessory 750 to the power tool. Removal of the fastener 820 in a direction opposite arrow 892 allows the projections 802, 806 to separate to loosen the attachment portion 754 and remove the accessory 750 from the power tool. The output element 18 may be secured or removed as described above with respect to FIGS. 1-25. Additionally, the accessory 750 may be positioned and secured to the housing of the power tool prior to adjusting the rod member 840 to achieve a distance D1

During operation, the rod member 840 extends beyond the blade, for example, by the distance D1 to ensure that the blade only reaches a depth D1' and nothing beyond D1'.

Thus, the invention provides, among other things, an oscillating multi tool having a tapered tool holder for providing a substantially zero-clearance fit, a toolless blade change mechanism and a lever with detent for operating the toolless blade change mechanism, an oscillating multi tool having an LED, an oscillating multi tool having an improved motor mount configuration and a balanced drive mechanism, and a compact configuration that does not interfere with the depth of cut. The invention also provides an adapter for adapting the tool holder to hold other types of output elements, the adapter having a substantially zero-clearance fit with both the tool holder and with output elements. The invention also provides snap-on accessories, such as a dust collector and a depth guide. A group of accessories, such as a dust collector and a depth guide, are attachable to the power tool by a snap-fit configuration. Each accessory in the group of accessories includes the same mating interface for mating with the power tool such that the accessories are interchangeable. The snap-fit configuration allows the accessory to rotate with respect to the tool while the accessory is attached to the tool.

Although the invention has been described with reference to certain preferred embodiments, variations and modifications exist within the scope and spirit of one or more independent aspects of the invention.

What is claimed is:
1. An oscillating power tool comprising:
  a housing;
  a motor disposed within the housing;
  a tool holder configured to be driven oscillatingly about an output axis by the motor;
  a flange configured to clamp an output element onto the tool holder, wherein the flange is configured to be movable in an axial direction defined by the output axis;
  a plunger operably coupled for movement with the flange in the axial direction, wherein the plunger and the flange are threadedly coupled to each other; and
  a lever configured to actuate the flange, the lever being pivotable between a clamping position and a release position,
  wherein the flange is configured to clamp the output element onto the tool holder in the clamping position,
  wherein the flange is configured to be displaced a first distance from the tool holder in the release position, and wherein the lever includes a cam surface including a substantially flat surface, the substantially flat surface configured to engage the plunger in the release position, wherein in the release position, a gap is disposed between the lever and the housing to allow the lever to be rotated past the release position, and wherein the lever is configured to displace the flange a second distance from the tool holder when rotated past the release position, wherein the second distance is larger than the first distance.

2. The oscillating power tool of claim 1, wherein the lever is pivotable about a pin, wherein the pin defines a pivot axis, wherein the pivot axis is substantially perpendicular to the output axis, and wherein the output axis intersects the pin.

3. The oscillating power tool of claim 1, wherein the flange has a threaded shaft extending therefrom, and wherein the plunger includes a threaded bore for receiving the threaded shaft.

4. The oscillating power tool of claim 1, wherein the flange includes a tab configured for finger-tightening the flange.

5. The oscillating power tool of claim 1, wherein the cam surface includes curved surfaces flanking the substantially flat surface.

6. The oscillating power tool of claim 1, further comprising a spring configured to bias the flange towards the tool holder.

7. The oscillating power tool of claim 6, wherein the spring is operatively disposed between the tool holder and the plunger.

8. An oscillating power tool comprising:
a housing;
a motor disposed within the housing;
a tool holder configured to be driven oscillatingly about an output axis by the motor;
a flange configured to clamp an output element onto the tool holder, wherein the flange is configured to be movable in an axial direction defined by the output axis;
a spring configured to provide a clamping force for clamping the output element;
a plunger operably coupled for movement with the flange in the axial direction; and
a lever configured to actuate the flange, the lever being pivotable between a clamping position and a release position,
wherein the flange is configured to clamp the output element onto the tool holder in the clamping position,
wherein the flange is configured to be displaced a first distance from the tool holder in the release position,
wherein the clamping force is at least partially relieved in the release position, and
wherein the lever includes a cam surface including a substantially flat surface, the substantially flat surface configured to engage the plunger in the release position,
wherein the lever is configured to rest in the release position,
wherein in the release position, a gap is disposed between the lever and the housing to allow the lever to be rotated past the release position, and
wherein the lever is configured to further relieve the clamping force when rotated past the release position.

9. The oscillating power tool of claim 8, wherein the spring is operatively disposed between the tool holder and the plunger.

10. The oscillating power tool of claim 8, wherein the spring is configured to bias the plunger towards the cam surface.

11. The oscillating power tool of claim 8, wherein the lever is configured to compress the spring by way of movement of the lever towards the release position and to further compress the spring by way of movement of the lever past the release position.

12. The oscillating power tool of claim 8, wherein the lever is pivotable about a pin defining a pivot axis, wherein the pivot axis is substantially perpendicular to the output axis, and wherein the output axis intersects the pin.

13. The oscillating power tool of claim 8, wherein the flange has a threaded shaft extending therefrom, and wherein the plunger includes a threaded bore for receiving the threaded shaft.

14. The oscillating power tool of claim 13, wherein the flange includes a tab configured for finger-tightening the flange.

15. The oscillating power tool of claim 8, wherein the cam surface includes curved surfaces flanking the substantially flat surface.

16. An oscillating power tool comprising:
a housing;
a motor disposed within the housing;
a tool holder configured to be driven oscillatingly about an output axis by the motor;
a flange configured to clamp an output element onto the tool holder, wherein the flange is configured to be movable in an axial direction defined by the output axis;
a spring configured to provide a clamping force for clamping the output element;
a plunger operably coupled for movement with the flange in the axial direction; and
a lever configured to actuate the flange, the lever being pivotable between a clamping position and a release position,
wherein the flange is configured to clamp the output element onto the tool holder in the clamping position,
wherein the flange is configured to be displaced a first distance from the tool holder in the release position,
wherein the clamping force is at least partially relieved in the release position, and
wherein the lever includes a cam surface defining a detent such that the lever is configured to rest in the release position by way of the detent,
wherein in the release position, a gap is disposed between the lever and the housing to allow the lever to be rotated past the release position, and
wherein the lever is configured to further relieve the clamping force when rotated past the release position.

17. The oscillating power tool of claim 16, wherein the lever is configured to compress the spring by way of movement of the lever towards the release position and to further compress the spring by way of movement of the lever past the release position.

18. The oscillating power tool of claim 16, wherein the flange has a threaded shaft extending therefrom, and wherein the plunger includes a threaded bore for receiving the threaded shaft.

19. The oscillating power tool of claim 18, wherein the flange includes a tab configured for finger-tightening the flange.

20. The oscillating power tool of claim 16, wherein the spring is configured to bias the plunger towards the cam surface.

\* \* \* \* \*